(12) United States Patent
Ahn et al.

(10) Patent No.: US 8,179,510 B2
(45) Date of Patent: May 15, 2012

(54) LIQUID CRYSTAL DISPLAY DEVICE AND FABRICATING METHOD THEREOF

(75) Inventors: Byung Chul Ahn, Anyang-si (KR); Byoung Ho Lim, Gumi-si (KR); Jae Jun Ahn, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 572 days.

(21) Appl. No.: 11/168,358

(22) Filed: Jun. 29, 2005

(65) Prior Publication Data
US 2006/0146212 A1 Jul. 6, 2006

(30) Foreign Application Priority Data
Dec. 31, 2004 (KR) .................. 10-2004-0118601

(51) Int. Cl.
G02F 1/1343 (2006.01)
G02F 1/1345 (2006.01)
G02F 1/13 (2006.01)

(52) U.S. Cl. ......... 349/141; 349/149; 349/152; 349/187

(58) Field of Classification Search .................. 349/141, 349/149, 152, 187
See application file for complete search history.

(56) References Cited

U.S. PATENT DOCUMENTS

| | | | |
|---|---|---|---|
| 5,162,933 A | 11/1992 | Kukuda et al. | |
| 5,317,433 A | 5/1994 | Miyawaki et al. | |
| 5,339,181 A | 8/1994 | Kim et al. | |
| 5,462,887 A | 10/1995 | Gluck | |
| 5,668,379 A | 9/1997 | Ono et al. | |
| 5,731,856 A | 3/1998 | Kim et al. | |
| 5,771,083 A | 6/1998 | Fujihara et al. | |
| 5,793,460 A | 8/1998 | Yang | |
| 5,847,781 A | 12/1998 | Ono et al. | |
| 6,177,970 B1 | 1/2001 | Kim | |
| 6,188,452 B1 * | 2/2001 | Kim et al. | 349/43 |
| 6,338,989 B1 * | 1/2002 | Ahn et al. | 438/158 |
| 6,608,660 B1 * | 8/2003 | Okamoto et al. | 349/113 |
| 6,771,346 B2 * | 8/2004 | Sugimoto et al. | 349/149 |
| 7,060,541 B2 * | 6/2006 | Lee et al. | 438/149 |
| 2002/0135293 A1 * | 9/2002 | Aruga | 313/493 |

(Continued)

FOREIGN PATENT DOCUMENTS
CN 1550857 A 12/2004

*Primary Examiner* — Lauren Nguyen
(74) *Attorney, Agent, or Firm* — McKenna Long & Aldridge, LLP

(57) ABSTRACT

A liquid crystal display device having first and second substrates; a gate line on the first substrate; a data line crossing the gate line to define a pixel area, the gate line and the data line having a gate insulating film there between; a thin film transistor including a gate electrode, a source electrode, a drain electrode and a semiconductor layer for defining a channel between the source electrode and the drain electrode; a common line in parallel to the gate line on the first substrate; a common electrode extended from the common line in the pixel area; and a pixel electrode spaced apart from the common line and the common electrode in the pixel area to be defined in a pixel hole passing through the gate insulating film, wherein the semiconductor layer overlaps with a source and drain metal pattern including the data line, the source electrode and the drain electrode, and wherein the drain electrode protrudes from the semiconductor layer toward an upper portion of the pixel electrode to be connected to the pixel electrode.

32 Claims, 30 Drawing Sheets

U.S. PATENT DOCUMENTS

| | | |
|---|---|---|
| 2003/0186488 A1 | 10/2003 | Wen et al. |
| 2003/0197181 A1* | 10/2003 | Yun .................................. 257/72 |
| 2004/0085488 A1* | 5/2004 | Cho et al. ......................... 349/40 |
| 2004/0165134 A1 | 8/2004 | Cho |
| 2004/0239838 A1* | 12/2004 | Lai .................................. 349/106 |
| 2005/0094079 A1* | 5/2005 | Yoo et al. ........................ 349/141 |
| 2006/0012742 A1* | 1/2006 | Tsai et al. ....................... 349/139 |

* cited by examiner

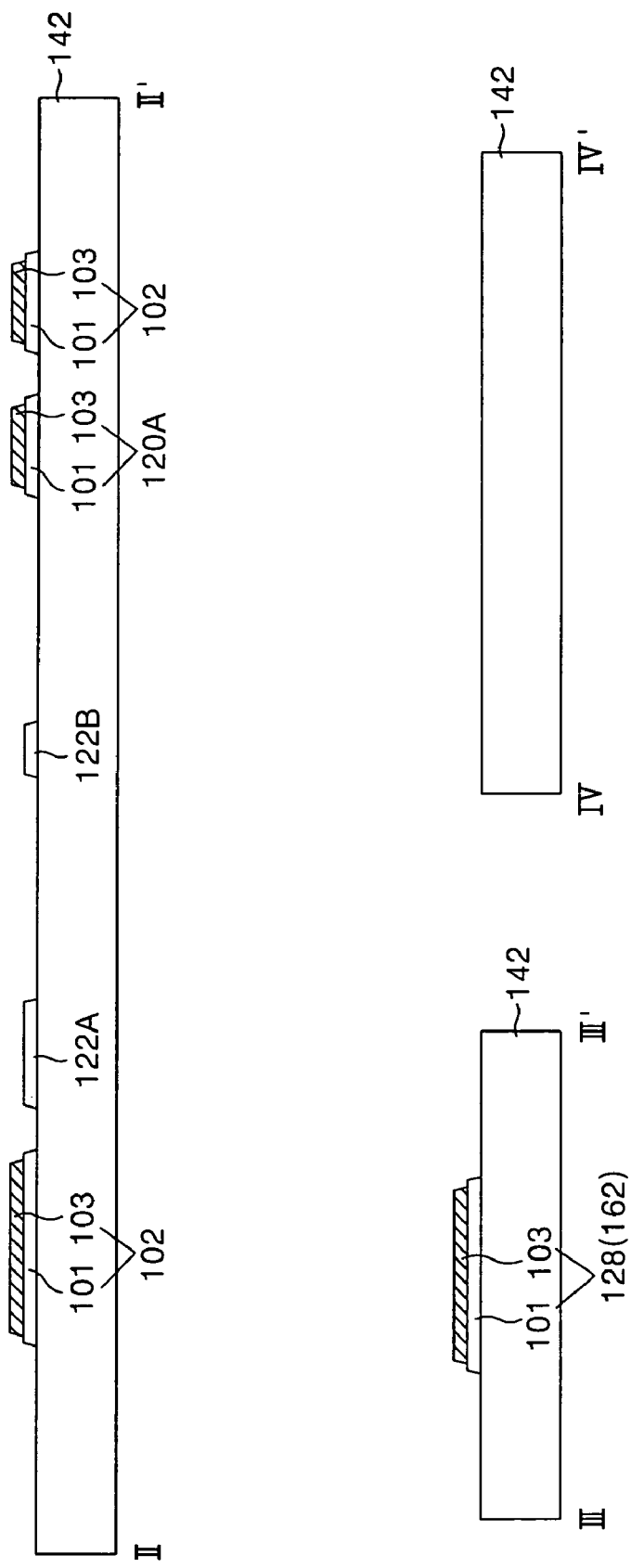

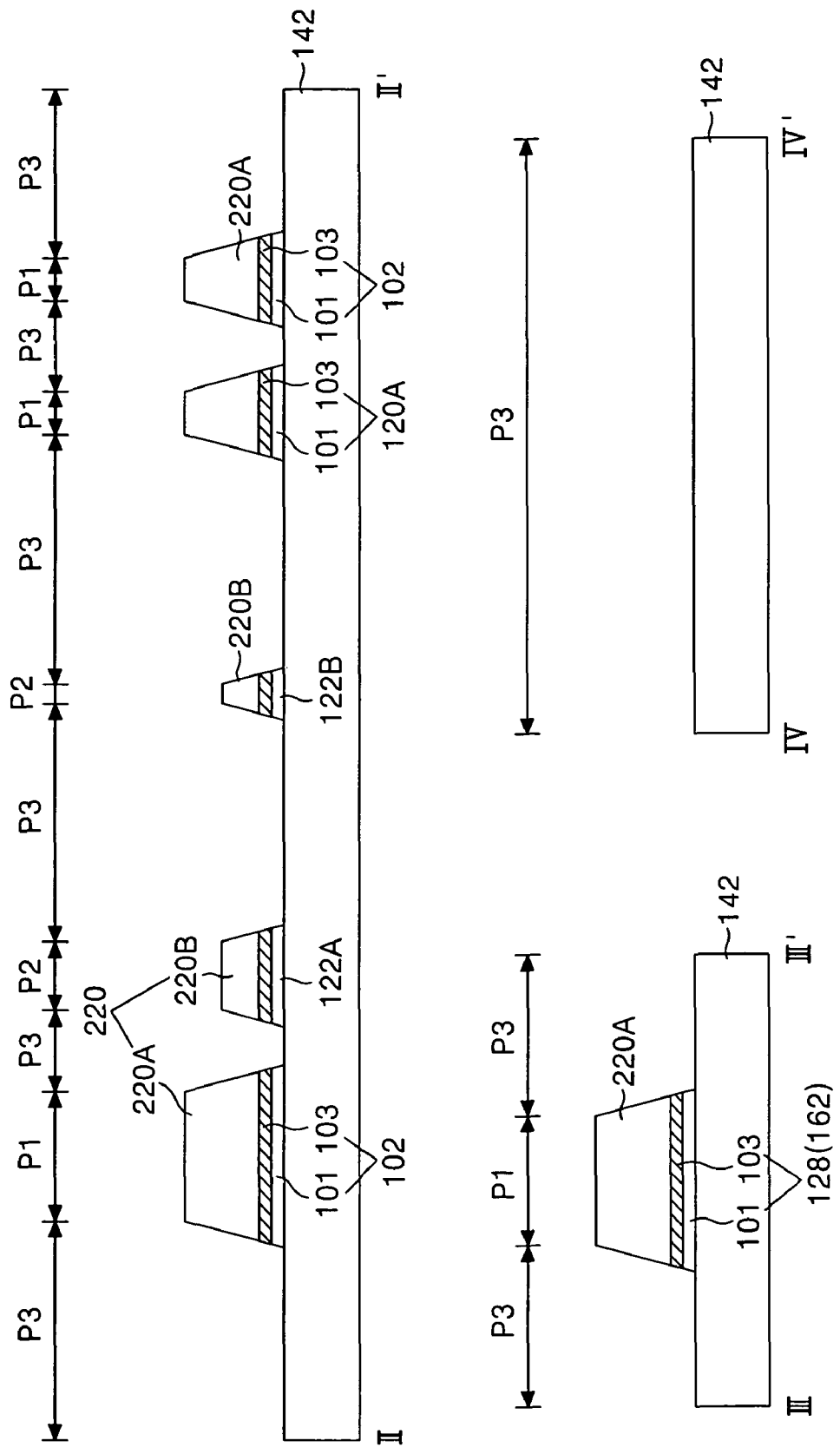

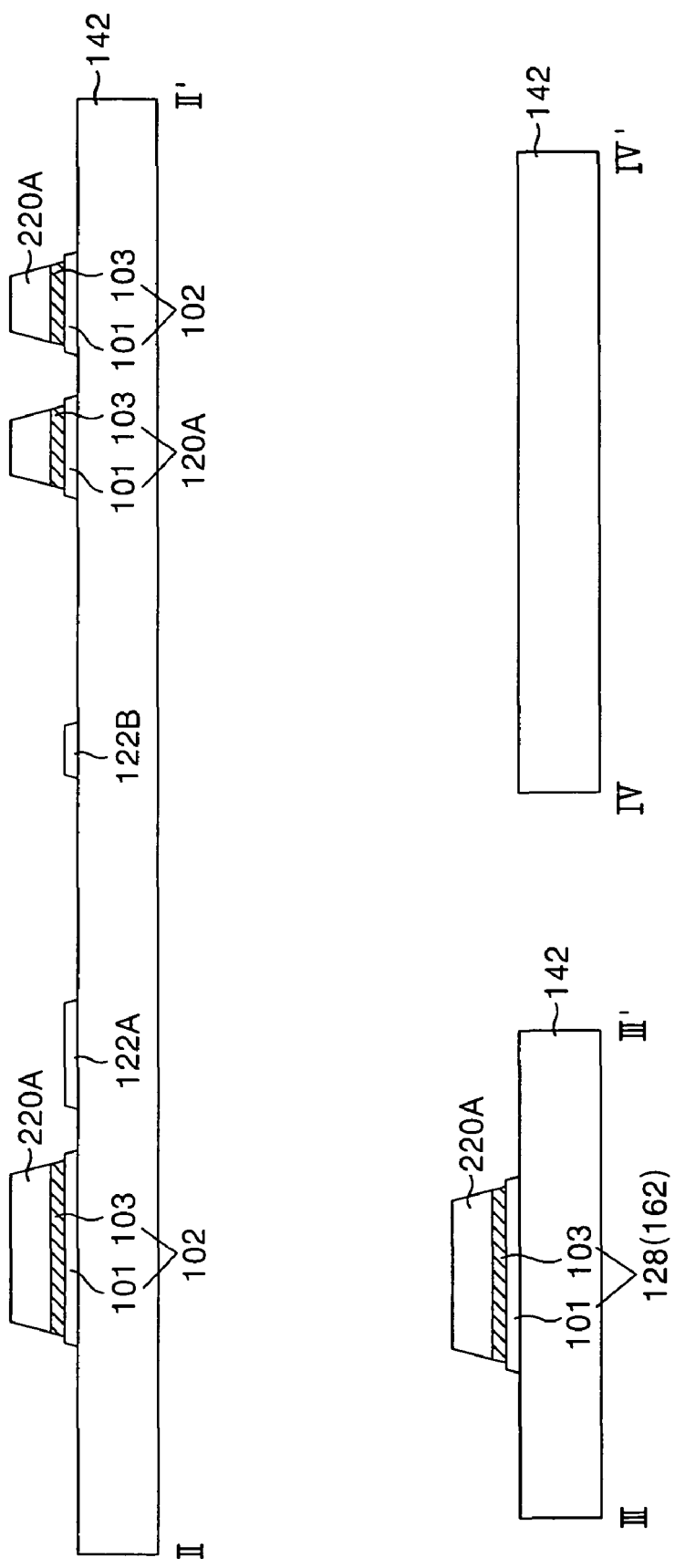

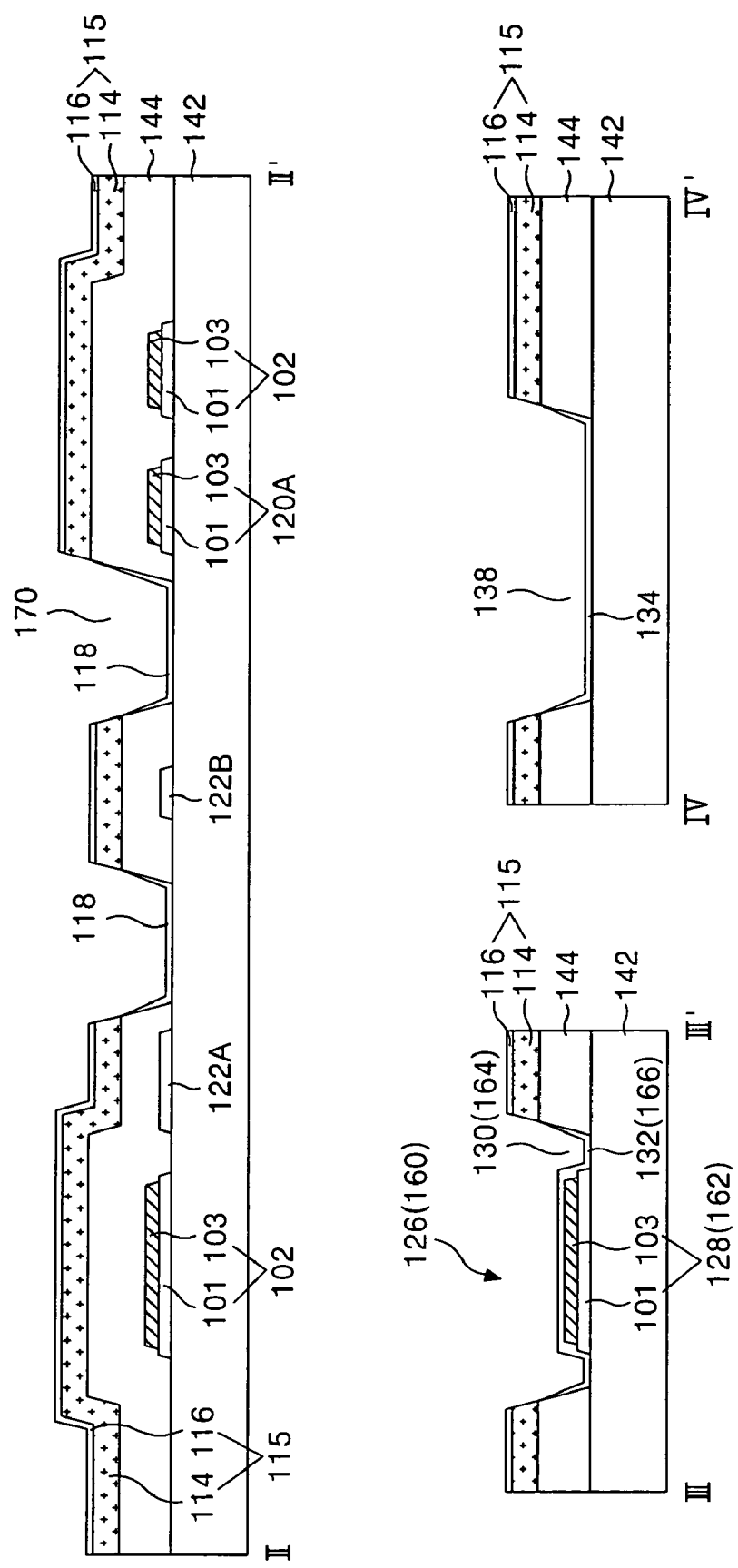

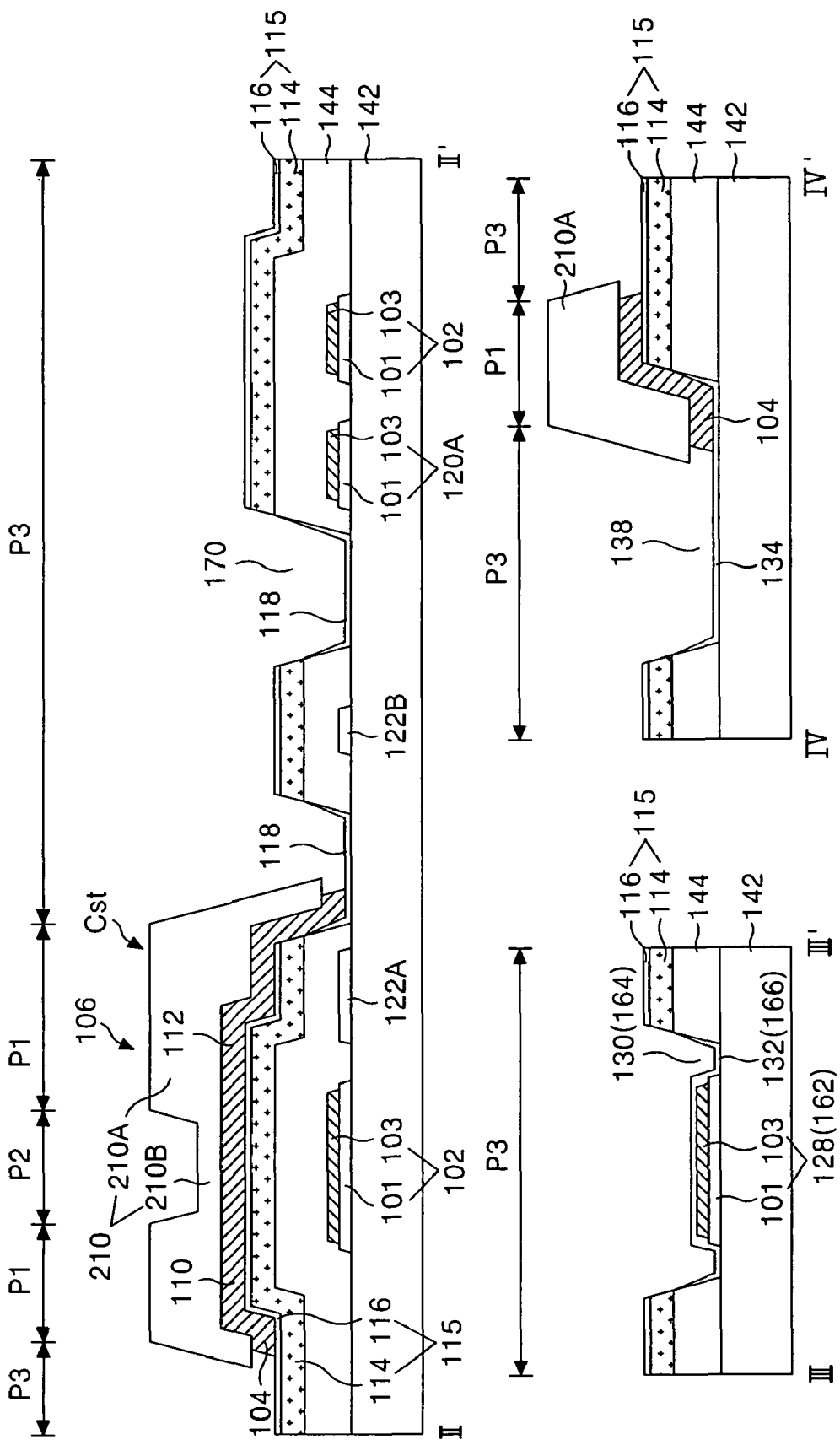

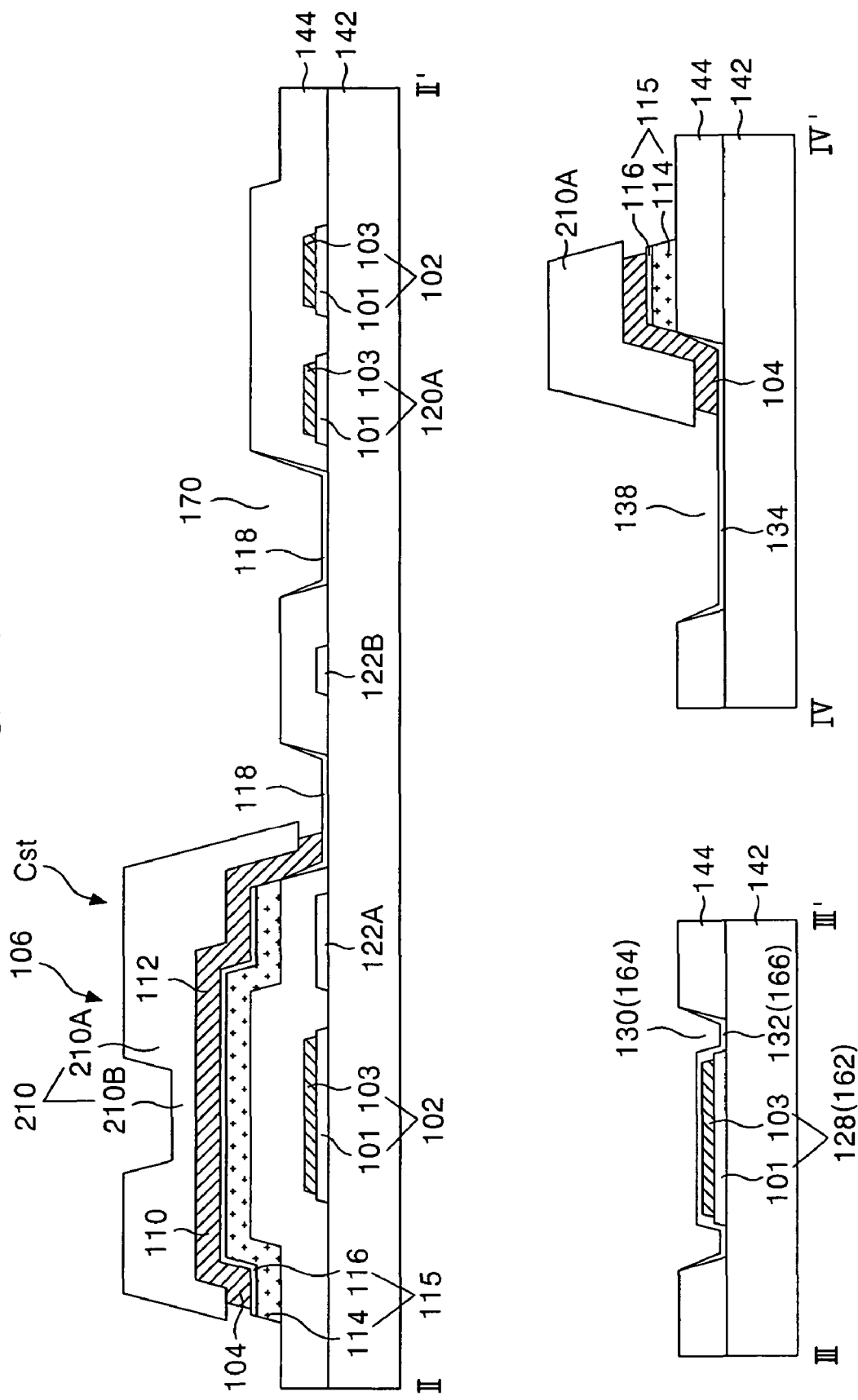

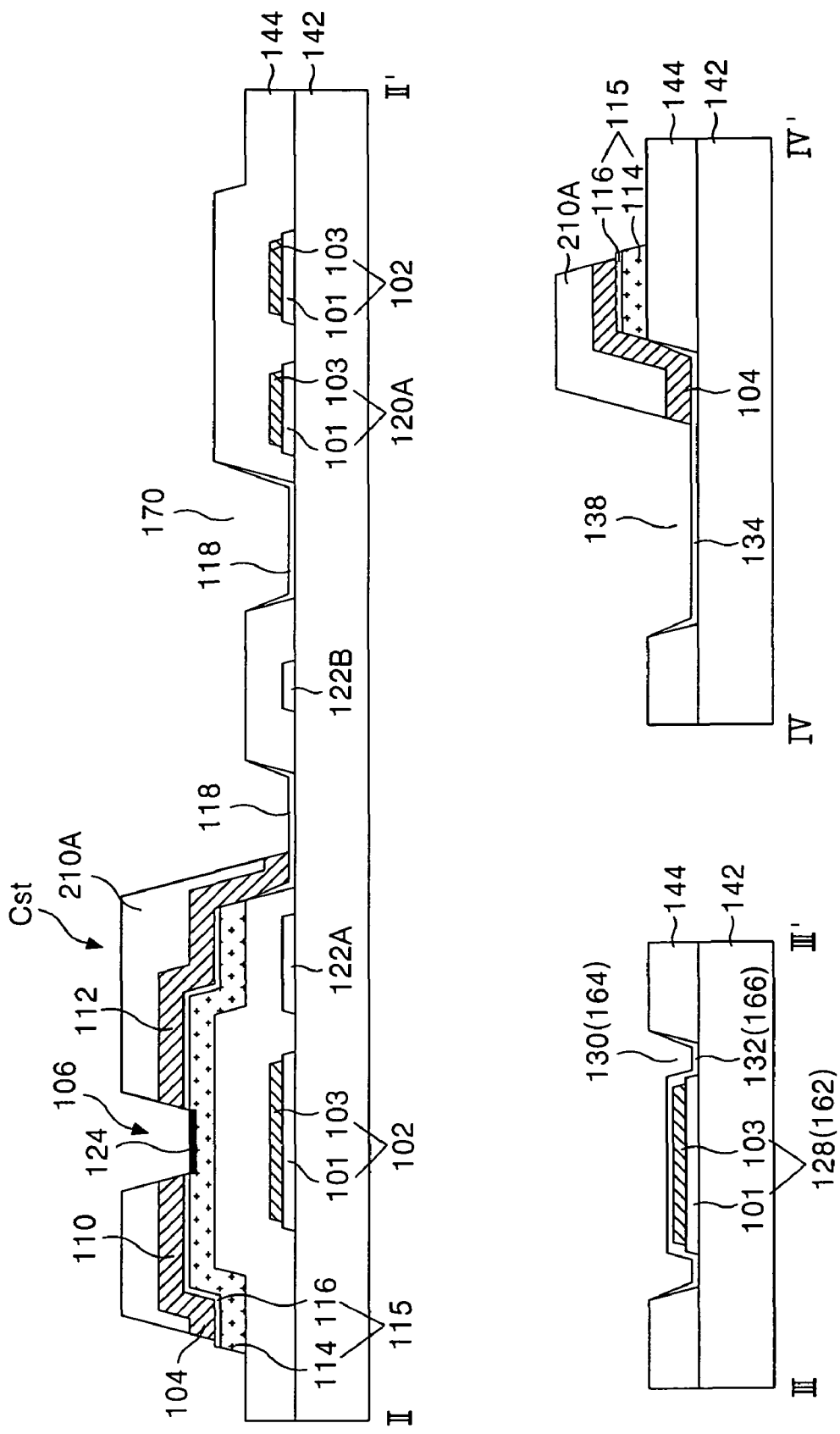

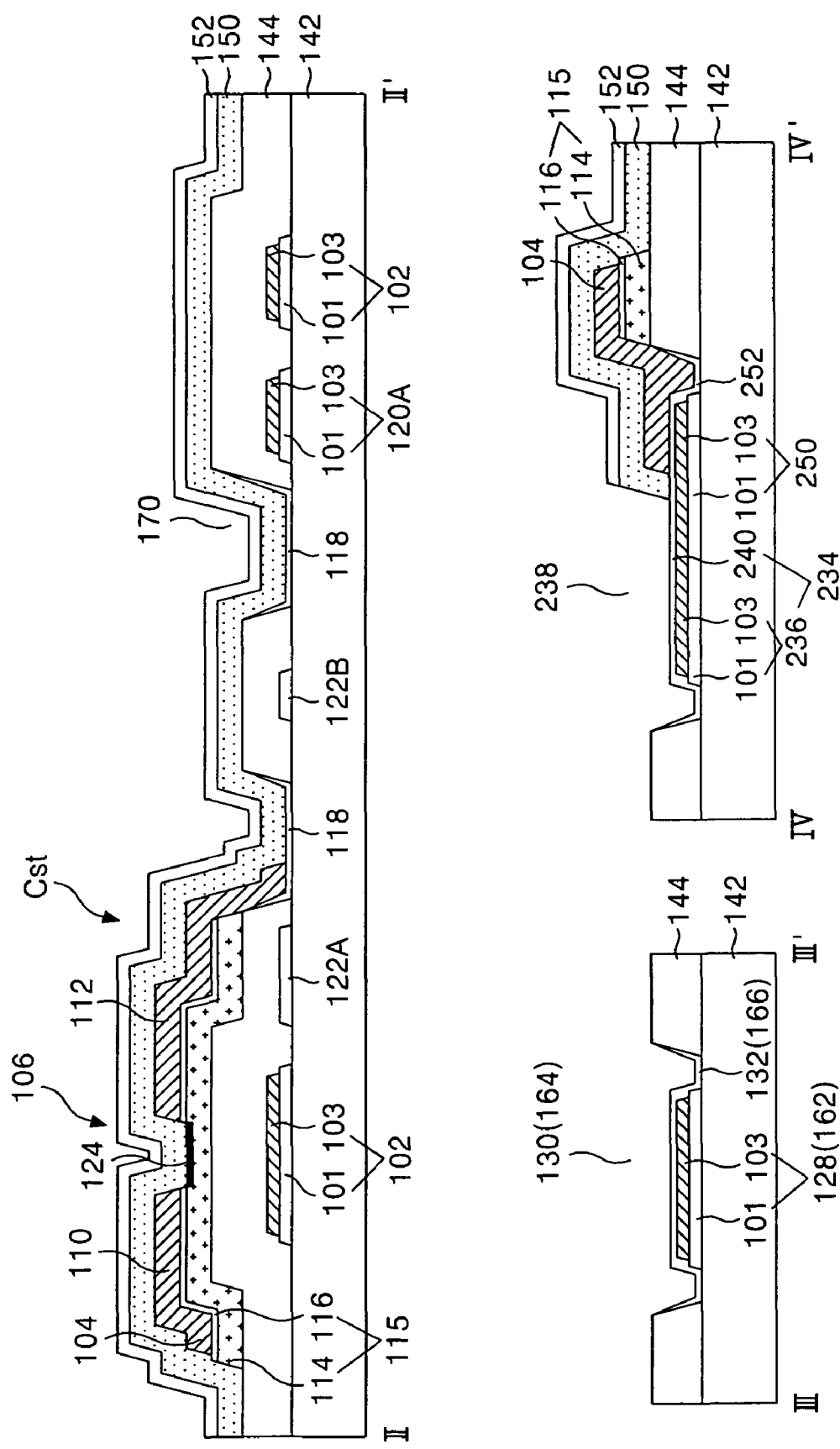

LIQUID CRYSTAL DISPLAY DEVICE AND FABRICATING METHOD THEREOF

This application claims the benefit of Korean Patent Application No. P2004-118601, filed Dec. 31, 2004, which is hereby incorporated by reference for all purposes as if fully set forth herein.

BACKGROUND OF THE INVENTION

1. Field of the Invention

This application claims the benefit of Korean Patent Application No. P2004-112584 filed in Korea on Dec. 24, 2004, which is hereby incorporated by reference.

This invention relates to a thin film transistor substrate applied to a display device, and more particularly to a thin film transistor substrate of the horizontal electric field applying type and a fabricating method thereof that are adaptive for simplifying a process. Also, the present invention is directed to a liquid crystal display panel employing said thin film transistor substrate and a fabricating method thereof that are adaptive for simplifying a process.

2. Discussion of the Related Art

Generally, a liquid crystal display (LCD) controls light transmittance of a liquid crystal having a dielectric anisotropy using an electric field to thereby display a picture. To this end, the LCD includes a liquid crystal display panel for displaying a picture by a liquid crystal cell matrix, and a driving circuit for driving the liquid crystal display panel.

Referring to FIG. 1, a related art liquid crystal display panel has a color filter substrate 10 and a thin film transistor substrate 20 that are joined to each other with having a liquid crystal 24 therebetween.

The color filter substrate 10 includes a black matrix 4, a color filter 6 and a common electrode 8 that are sequentially provided on an upper glass substrate 2. The black matrix 4 is provided in a matrix type on the upper glass substrate 2. The black matrix 4 divides an area of the upper glass substrate 2 into a plurality of cell areas to be provided with the color filter 6, and prevents a light interference between adjacent cells and an external light reflection. The color filter 6 is provided at the cell area divided by the black matrix 4 in such a manner as to be divided into red (R), green (G) and blue (B) ones, thereby transmitting red, green and blue lights. The common electrode 8 is formed from a transparent conductive layer entirely coated onto the color filter 6, and supplies a common voltage Vcom that serves as a reference voltage upon driving of the liquid crystal 24. Further, an over-coated layer (not illustrated) for smoothing the color filter 6 may be provided between the color filter 6 and the common electrode 8.

The thin film transistor substrate 20 includes a thin film transistor 18 and a pixel electrode 22 provided for each cell area defined by an crossing between a gate line 14 and a data line 16 at a lower glass substrate 12. The thin film transistor 18 applies a data signal from the data line 16 to the pixel electrode 22 in response to a gate signal from the gate line 14. The pixel electrode 22 formed from a transparent conductive layer supplies a data signal from the thin film transistor 18 to drive the liquid crystal 24.

The liquid crystal 24 having a dielectric anisotropy is rotated in accordance with the strength of an electric field created by a data signal from the pixel electrode 22 and a common voltage Vcom from the common electrode 8 to control light transmittance, thereby implementing a gray scale level.

Further, the liquid crystal display panel includes a spacer (not illustrated) for maintaining a constant cell gap between the color filter substrate 10 and the thin film transistor substrate 20.

In such a liquid crystal display panel, the color filter substrate 10 and the thin film transistor substrate 20 are formed by a plurality of mask processes. For example, one mask process includes a lot of processes such as thin film deposition (coating), cleaning, photolithography, etching, photo-resist stripping and inspection processes, etc.

Particularly, because the thin film transistor substrate includes the semiconductor process and requires the plurality of mask processes, it has a complicated fabricating process to act as a major factor in the manufacturing cost rise of the liquid crystal display panel. Therefore, the thin film transistor substrate has been developed toward a reduction in the number of mask process.

Meanwhile, the liquid crystal displays are largely classified into a vertical electric field applying type and a horizontal electric field applying type depending upon with a direction of the electric field driving the liquid crystal.

The liquid crystal display of vertical electric field applying type drives a liquid crystal in a twisted nematic (TN) mode with a vertical electric field formed between a pixel electrode and a common electrode arranged opposite each other on the upper and lower substrate. The liquid crystal display of vertical electric field applying type has an advantage of a large aperture ratio while having a drawback of a narrow viewing angle about 90°.

The liquid crystal display of the horizontal electric field applying type drives a liquid crystal in an in-plane switching (IPS) mode with a horizontal electric field between the pixel electrode and the common electrode arranged in parallel to each other on the lower substrate. The liquid crystal display of the horizontal electric field applying type has an advantage of a wide viewing angle about 160°.

The thin film transistor substrate in the liquid crystal display of the horizontal electric field applying type also requires a plurality of mask process, thereby having the drawback of a complicated fabricating process. Therefore, in order to reduce the manufacturing cost, it is necessary to reduce the number of mask processes.

SUMMARY OF THE INVENTION

Accordingly, it is an advantage of the present invention to provide a thin film transistor substrate of the horizontal electric field applying type and a fabricating method thereof; and a liquid crystal display panel using the same and a fabricating method thereof that are adaptive for simplifying a process.

In order to achieve these and other advantages of the invention, a liquid crystal display device according to one aspect of the present invention comprises first and second substrates; a gate line on the first substrate; a data line crossing the gate line with having a gate insulating film there between to define a pixel area; a thin film transistor including a gate electrode, a source electrode, a drain electrode and a semiconductor layer for defining a channel between the source electrode and the drain electrode; a common line in parallel to the gate line on the first substrate; a common electrode extended from the common line in the pixel area; and a pixel electrode spaced apart from the common line and the common electrode in the pixel area to be defined in a pixel hole passing through the gate insulating film, wherein the semiconductor layer overlaps with a source and drain metal pattern including the data line, the source electrode and the drain electrode, and the drain electrode protrudes from the semiconductor layer toward an upper portion of the pixel electrode to be connected to the pixel electrode.

A method of fabricating a liquid crystal display device according to still another aspect of the present invention comprises providing first and second substrates; a first mask process of forming a first mask pattern group including a gate line, a gate electrode, a common line and a common electrode on the first substrate; a second mask process of forming a gate insulating film on the first mask pattern group and a semiconductor layer and then defining a pixel hole spaced apart from the common line and a common electrode to pass through the gate insulating film and the semiconductor layer in a pixel area, and forming a pixel electrode in the pixel hole; and a third mask process of forming a source and drain metal pattern including a data line crossing the gate line to define the pixel area, a source electrode and a drain electrode on the first substrate, and exposing an active layer of the semiconductor pattern to define a channel between the source electrode and the drain electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5A and FIG. 5B are a plan view and a section view for explaining a first mask process in a method of fabricating the thin film transistor substrate of the horizontal electric field applying type according to the embodiment of the present invention, respectively;

FIG. 6A to FIG. 6C are section views for specifically explaining the first mask process;

FIG. 8A to FIG. 8C are section views for specifically explaining the second mask process;

FIG. 10A to FIG. 10D are section views for specifically explaining the third mask process;

FIG. 17A and FIG. 17B are section views for explaining a method of fabricating a protective film according to another embodiment of the present invention.

DETAILED DESCRIPTION OF THE ILLUSTRATED EMBODIMENTS

Figure 1:
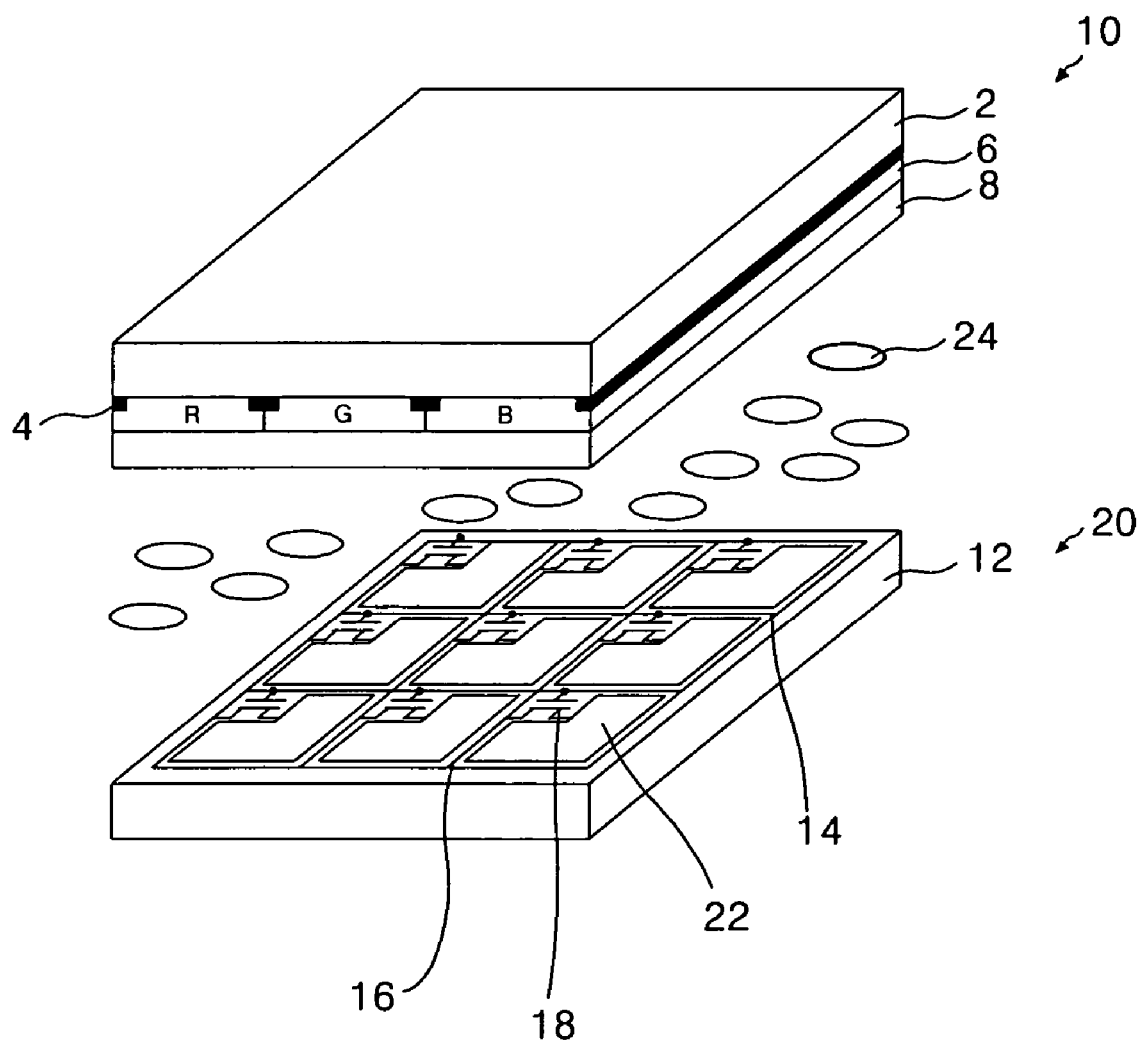
FIG. 1 is a schematic perspective view illustrating a structure of a related art liquid crystal display panel.
Figure 2:
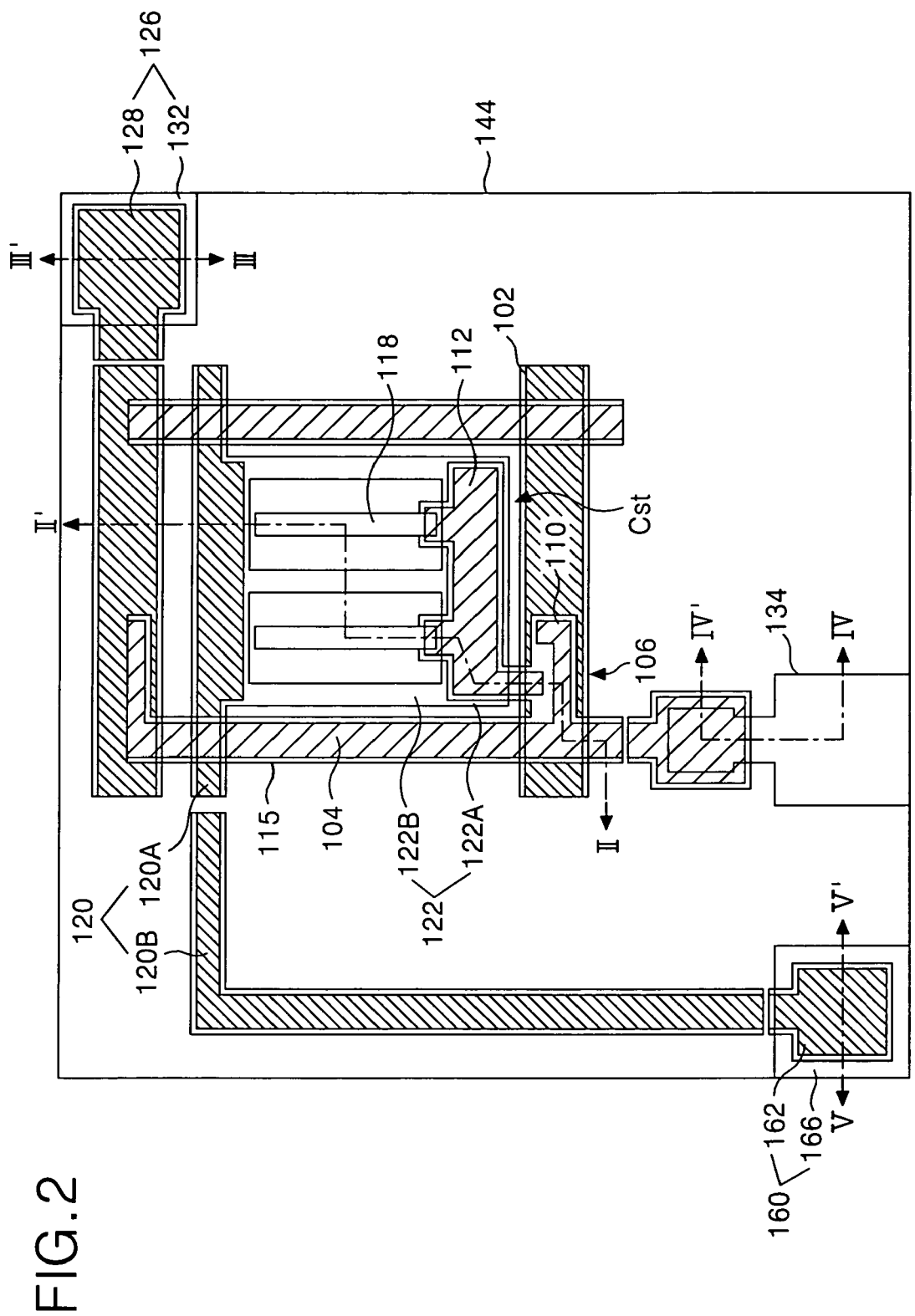
FIG. 2 is a plan view illustrating a structure of a thin film transistor substrate of the horizontal electric field applying type according to a first embodiment of the present invention.
Figure 3:
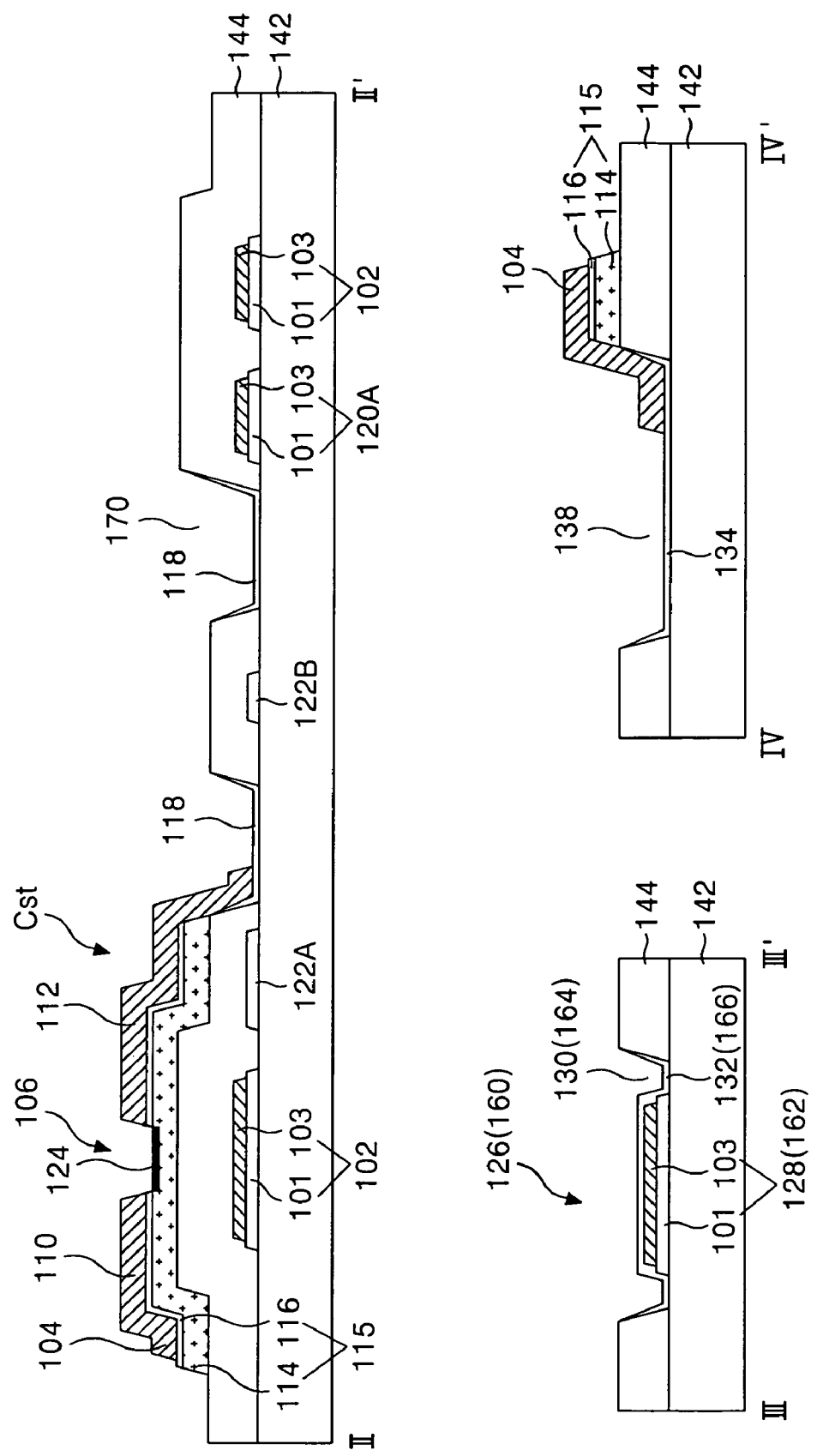
FIG. 3 is a section view of the thin film transistor substrate taken along the II-II', III-III' and IV-IV' lines in FIG. 2.

FIG. 2 is a plan view illustrating a structure of a thin film transistor substrate of the horizontal electric field applying type according to a first embodiment of the present invention, and FIG. 3 is a section view of the thin film transistor substrate taken along the II-II', III-III' and IV-IV' lines in FIG. 2.

Referring to FIG. 2 and FIG. 3B, the thin film transistor substrate of the horizontal electric field applying type includes a gate line 102 and a data line 104 provided on a lower substrate 142 crossing each other, having a gate insulating film 144 therebetween, a thin film transistor 106 connected to each crossing, a pixel electrode 118 and a common electrode 122 provided at a pixel area defined by the crossing structure to form a horizontal electric field, a common line 120 connected to the common electrode 122, and a storage capacitor Cst provided at an overlapping portion between the common electrode 122 and the drain electrode 112. Further, thin film transistor substrate includes a gate pad 126 connected to the gate line 102, and a data pad 134 connected to the data line 104.

The gate line 102 supplies a scanning signal from a gate driver (not illustrated) while the data line 104 supplies a video signal from a data driver (not illustrated). The gate line 102 and the data line 104 cross each other with having a gate insulating film 144 therebetween to define the pixel area.

The gate line 102 is formed on the substrate 142 in a multiple-layer structure having at least double gate metal layers built including a transparent conductive layer. For instance, the gate line 102 has a double-layer structure in which a first conductive layer 101 employing a transparent conductive layer and a second conductive layer 103 formed of an opaque metal are built. The first conductive layer 101 are formed of ITO, TO, IZO or ITZO, etc. while the second conductive layer is formed of Cu, Mo, Al, a Cu alloy, a Mo alloy and an Al alloy, etc. Alternatively, the gate line 102 may be formed only of the second conductive layer 103.

The thin film transistor 106 allows a pixel signal applied to the data line 104 to be charged into the pixel electrode 118 and be kept in response to a scanning signal applied to the gate line 102. To this end, the thin film transistor 106 includes a gate electrode included in the gate line 102, a source electrode 110 connected to the data line 104, a drain electrode 112 positioned in opposition to the source electrode 110 to be connected to the pixel electrode 118, an active layer 114 overlapping with the gate line 102 with having the gate insulating film 144 therebetween to provide a channel between the source electrode 110 and the drain electrode 112, and an ohmic contact layer 116 formed on the active layer 114 other than the channel portion to make an ohmic contact with the source electrode 110 and the drain electrode 112.

Further, a semiconductor layer 115 including the active layer 114 and the ohmic contact layer 116 is overlapped along the data line 104.

The common line 120 and the common electrode 122 supply a reference voltage for driving the liquid crystal, that is, a common voltage to each pixel.

To this end, the common line 120 includes an internal common line 120A provided in parallel to the gate line 102 at a display area, and an external common line 120B commonly connected to the internal common line 120A at an non-display area. The common line 120 has a multiple-layer structure in which the first and second conductive layers 101 and 103 are disposed on the substrate 150 along with the above-mentioned gate line 102. Alternatively, the common line 120 may be formed only from the second conductive layer 103.

The common electrode 122 is provided within the pixel area to be connected to the internal common line 120A. More specifically, the common electrode 122 includes a horizontal part 122A overlapping with the drain electrode 112 adjacently with the gate line 102, and a finger part 122B extended from the horizontal part 122A into the pixel area to be connected to the internal common line 120A. The common electrode 122 is formed from the first conductive layer of the common line 120, that is, a transparent conductive layer.

The storage capacitor Cst is provided such that the first horizontal part 122A of the common electrode 122 overlaps with the drain electrode 112 with having the gate insulating film 152 and the semiconductor layer 115 therebetween. For example, the drain electrode 112 is provided in such a manner as to overlap with the first horizontal part 122A of the common electrode 122 as widely as possible. Thus, a capacitance value of the storage capacitor Cst is increased by the wide overlapping area between the common electrode 122 and the pixel electrode 118, so that the storage capacitor Cst allows a video signal charged in the pixel electrode 118 to be stably maintained until the next signal is charged.

The pixel electrode 118 is provided within a pixel hole 170 passing through the gate insulating film 144 in such a manner as to be parallel to the finger part 122B of the common electrode 122. Thus, the pixel electrode 118 is provided and exposed on the substrate 142 in such a manner as to make an interface with the edge of the gate insulating film 144 within the pixel hole 170. Accordingly, the pixel electrode 118 is connected to a protrusion of the drain electrode 112 protruded from the overlapping portion between it and the semiconductor layer 115 upward the pixel electrode 118. Further, the pixel electrode 118 is spaced without any overlap from the common line 120A and the horizontal part 122A of the common electrode 122. If a video signal is applied, via the thin film transistor 106, to the pixel electrode 118, then a horizontal electric is formed between the pixel electrode 118 and the finger part 122B of the common electrode 122 supplied with the common voltage.

Liquid crystal molecules arranged in the horizontal direction between the thin film transistor array substrate and the color filter array substrate by such a horizontal electric field is rotated due to a dielectric anisotropy. Transmittance of a light transmitting the pixel area is differentiated depending upon a rotation extent of the liquid crystal molecules, thereby implementing a gray level scale.

Further, the finger part 122B of the common electrode 122 and the pixel electrode 118 can be formed in a zigzag shape. Also, the data line may be formed in a zigzag shape along the finger part 122B of the adjacent common electrode 122.

The gate line 102 receives a scanning signal from a gate driver via the gate pad 126. The gate pad 126 includes a lower gate pad electrode 128 extended from the gate line 102, and an upper gate pad electrode 132 provided within a first contact hole 130 passing through the gate insulating film 144 to be connected to the lower gate pad electrode 128. For example, the upper gate pad electrode 132, along with the pixel electrode 118, is formed of a transparent conductive layer, and makes an interface with the edge of the gate insulating film 144 enclosing the first contact hole 130.

The common line 120 receives a common voltage from a common voltage generator via the common pad 160. The common pad 160 has the same vertical structure as the gate pad 126. In other words, the common pad 160 includes a lower common pad electrode 162 extended from the common line 120, and an upper common pad electrode 166 provided within a second contact hole 164 passing through the gate insulating film 144 to be connected to the lower common pad electrode 162. For example, the upper common pad electrode 166, along with the pixel electrode 118, is formed of a transparent conductive layer, and makes an interface with the edge of the gate insulating film 144 enclosing the second contact hole 164.

The data line 104 receives a pixel signal from a data driver via a data pad 134. The data pad 134 is formed from a transparent conductive layer within a third contact hole 138 passing through the gate insulating film 144 along with the upper gate pad electrode 132. The third contact hole 138 provided with the data pad 134 is extended in such a manner as to overlap with a portion of the data line 104. Thus, the data line 104 protrudes from the overlapping portion between it and the semiconductor layer 115 into the third contact hole 138 to be connected to the extending portion of the data pad 134.

Figure 4:
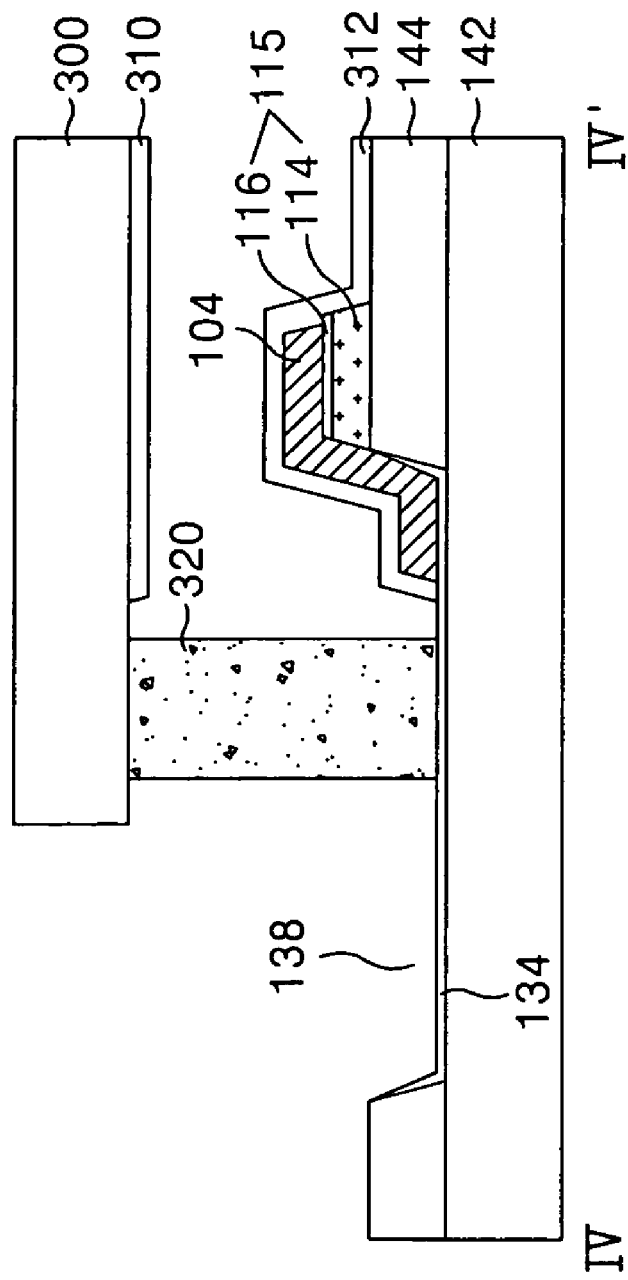
FIG. 4 is a section view illustrating a data pad area of a liquid crystal display panel employing the thin film transistor substrate of the horizontal electric field applying type illustrated in FIG. 3.

In this case, the data line 104 is exposed due to an absence of the protective film. In order to prevent the data line 104 from being exposed to the exterior thereof and oxidized, as illustrated in FIG. 4, the extending portion of the data pad 134 and the connecting portion of the data line 104 are positioned within an area sealed by a sealant 320. Thus, the data line 104 positioned at the sealed area is protected by a lower alignment film 312 to be formed thereon.

Referring to FIG. 4, a thin film transistor substrate coated with the lower alignment film 312 and a color filter substrate 300 coated with an upper alignment film 310 are joined to each other by the sealant 320, and a cell gap between two substrates sealed by the sealant 320 is formed with a liquid crystal. The upper and lower alignment films 310 and 312 are coated with an organic insulating material at a picture display area of the two substrates. The sealant 320 is formed with being spaced in such a manner as to be not in contact with the upper and lower alignment films 310 and 312 for the purpose of reinforcing an adhesive force. Thus, the data line 104 provided at the thin film transistor substrate, along with the source electrode 110 and the drain electrode 112, is positioned at an area sealed by the sealant 320, so that it can be sufficiently protected by the lower alignment film 312 coated thereon as well as by the liquid crystal formed in the sealed area.

As described above, in the thin film transistor substrate according to the first embodiment of the present invention, a transparent conductive pattern including the pixel electrode 118, the upper gate pad electrode 132, the upper common pad electrode 166 and the data pad 140 is formed by a lift-off process of a photo-resist pattern used upon defining of the pixel hole 170 and the contact holes 130, 164 and 138 passing through the gate insulating film 144. Thus, the transparent conductive pattern is provided on the substrate 142 in such a manner as to make an interface with the edge of the gate insulating film 144 enclosing the corresponding hole.

Further, the semiconductor layer 115 is patterned in similarity to the gate insulating film 144 and then has an exposure portion removed upon formation of a source/drain metal pattern including the data line 104, the source electrode 110 and the drain electrode 112. Further, upon formation of the source/drain metal pattern, the active layer 114 is exposed to define a channel of the thin film transistor 106. Thus, the semiconductor layer 115 has a structure formed only at the channel portion between the source electrode 110 and the drain electrode 112 and the overlapping portion between the source/drain metal pattern and the gate insulating film 144. Further, a surface layer 124 of the exposed active layer 114 is subject to a surface treatment by plasma, so that the active layer 114 of the channel portion may be protected by the surface layer 124 oxidized by SiO2.

The thin film transistor substrate of the horizontal electric field applying type according to the first embodiment of the present invention having the above-mentioned structure is formed by the following three-round mask process.

Figure 5A:
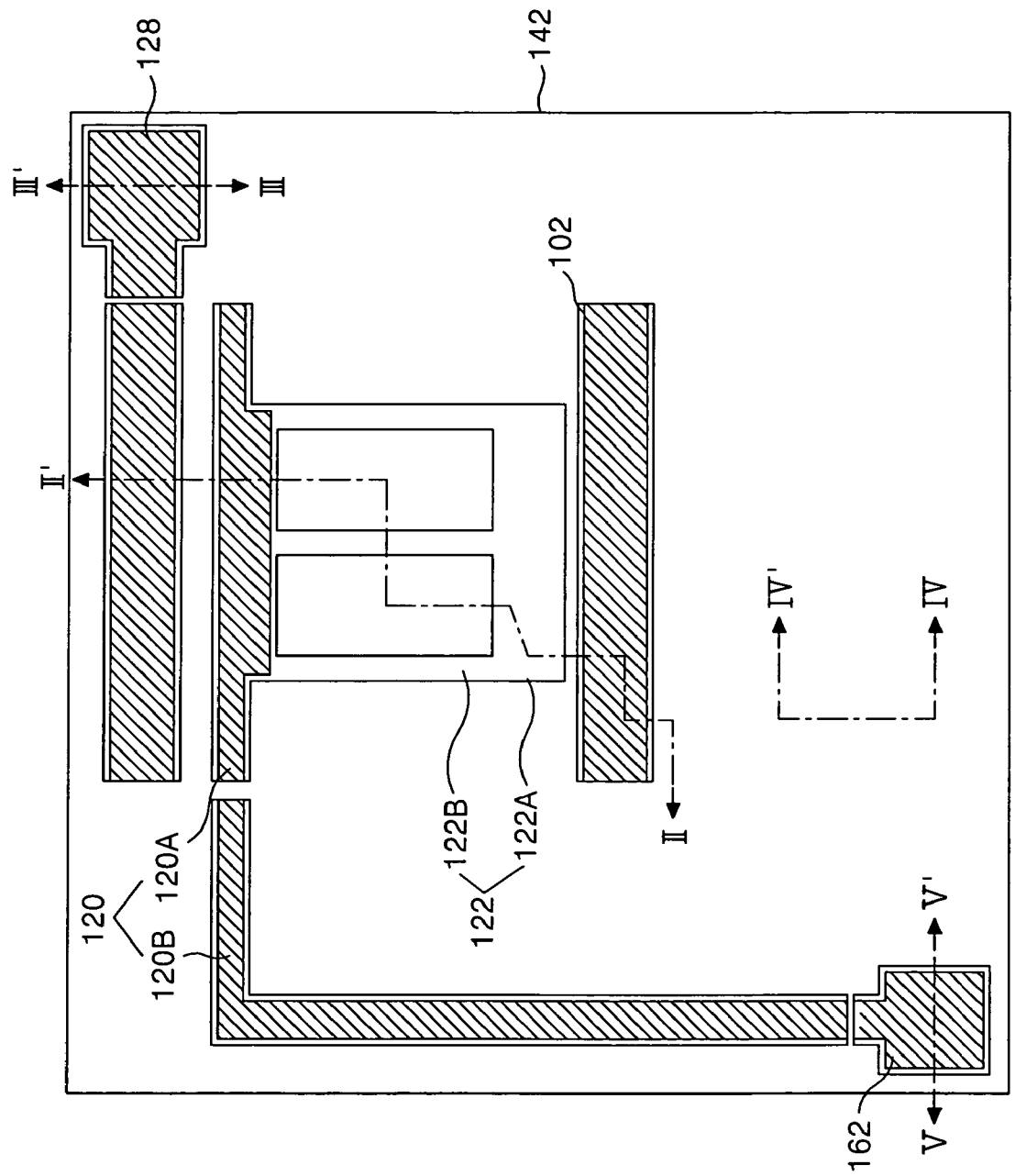
Figure 6C:
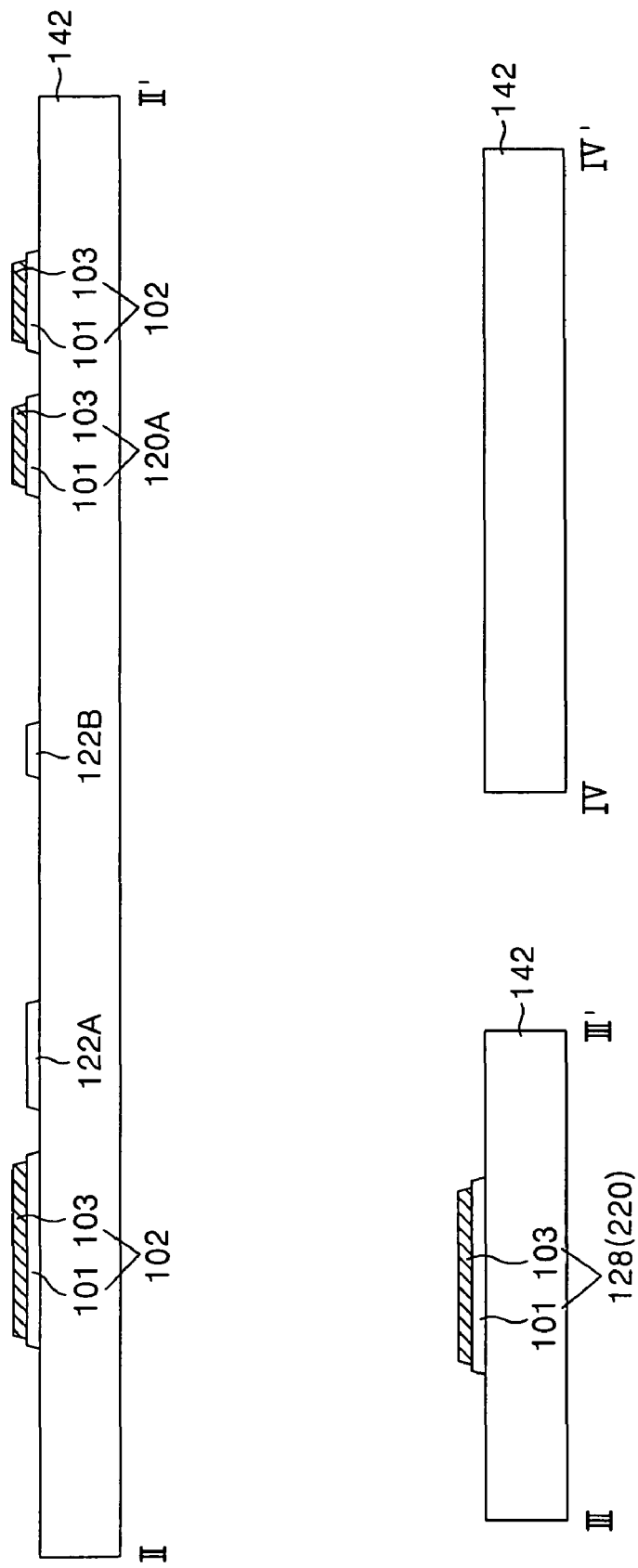

FIG. 5A and FIG. 5B are a plan view and a section view for explaining a first mask process, respectively, in a method of fabricating the thin film transistor substrate of the horizontal electric field applying type according to the embodiment of the present invention, and FIG. 6A to FIG. 6C are section views for specifically explaining the first mask process.

A first mask pattern group including the gate line 102, the lower pad electrode 126, the common line 120, the common electrode 122 and the lower common pad electrode 142 is formed on the lower substrate 142 by the first mask process. For example, the first mask pattern group other than the common electrode 122 has a multiple-layer structure in which at least two conductive layers are built. But, for explanation convenience sake, there will be described only a double-layer structure having the first and second conductive layers 101 and 103 built. The common electrode 122 has a single-layer structure of the first conductive layer 101 that is a transparent conductive layer. The first mask pattern group having the multiple-layer structure and the single-layer structure is formed by a single of mask process using a partial transmitting mask such as a diffractive exposure mask or a half tone mask, etc.

Referring to FIG. 6A, the first and second conductive layers 101 and 103 are disposed on the lower substrate 142 by a deposition technique such as the sputtering, etc. The first conductive layer 101 is formed of a transparent conductive material such as ITO, TO, IZO or ITZO, etc. On the other hand, the second conductive layer 103 employs a single layer formed of a metal material such as Mo, Ti, Cu, AlNd, Al, Cr, a Mo alloy, a Cu alloy or an Al alloy, etc., or takes a layer built structure of at least double layers such as Al/Cr, Al/Mo, Al(Nd)/Al, Al(Nd)/Cr, Mo/Al(Nd)/Mo, Cu/Mo, Ti/Al(Nd)/Ti, Mo/Al, Mo/Ti/Al(Nd), Cu-alloy/Mo, Cu-alloy/Al, Cu-alloy/Mo-alloy, Cu-alloy/Al-alloy, Al/Mo alloy, Mo-alloy/Al, Al-alloy/Mo-alloy, Mo-alloy/Al-alloy, Mo/Al alloy, Cu/Mo alloy Cu/Mo(Ti) or Cu/Mo(Ti), etc.

Subsequently, a first photo-resist pattern 220 including photo-resist patterns 220A and 220B having a different thickness is formed by the photolithography using the partial transmitting mask. The partial transmitting mask includes a shielding part for shielding an ultraviolet ray, a partial transmitting part for diffracting the ultraviolet ray using a slit pattern or partially transmitting the ultraviolet ray using a phase-shifting material, and a full transmitting part for fully transmitting the ultraviolet ray. The first photo-resist pattern 220 including a different thickness of photo-resist patterns 220A and 220B and an aperture part is formed by the photolithography using the partial transmitting mask. In this case, a relatively thick photo-resist pattern 220A is provided at a shielding area P1 overlapping with the shielding part of the partial transmitting mask; the photo-resist pattern 220B thinner than the photo-resist pattern 220A is provided at a partial exposure area P2 overlapping with the partial transmitting part; and the aperture part is provided at an full exposure area P3 overlapping with the full transmitting part.

Further, the exposed portions of the first and second conductive layers 101 and 103 are etched by an etching process using the first photo-resist pattern 220 as a mask, thereby providing the first mask pattern group including a double-layer structure of the gate line 102, the lower gate pad electrode 126, the common line 120, the common electrode 122 and the lower common pad electrode 142.

Referring to FIG. 6B, a thickness of the photo-resist pattern 220A is thinned and the photo-resist pattern 220B is removed by the ashing process using an oxygen (O2) plasma. Further, the second conductive layer 103 on the common electrode 122 is removed by the etching process using the ashed photo-resist pattern 220A as a mask. In this case, each side of the patterned second conductive layer 103 is again etched along the ashed photo-resist pattern 220A, thereby allowing the first and second conductive layers 101 and 103 of the first mask pattern group to has a constant step coverage in a stepwise shape. Accordingly, when the side surfaces of the first and second conductive layers 101 and 103 have a high steep inclination; it becomes possible to prevent a step coverage badness of the gate insulating film 152 that may be generated thereon.

Referring to FIG. 6C, the photo-resist pattern 220A left on the first mask pattern group in FIG. 6B is removed by the stripping process.

Figure 7A:
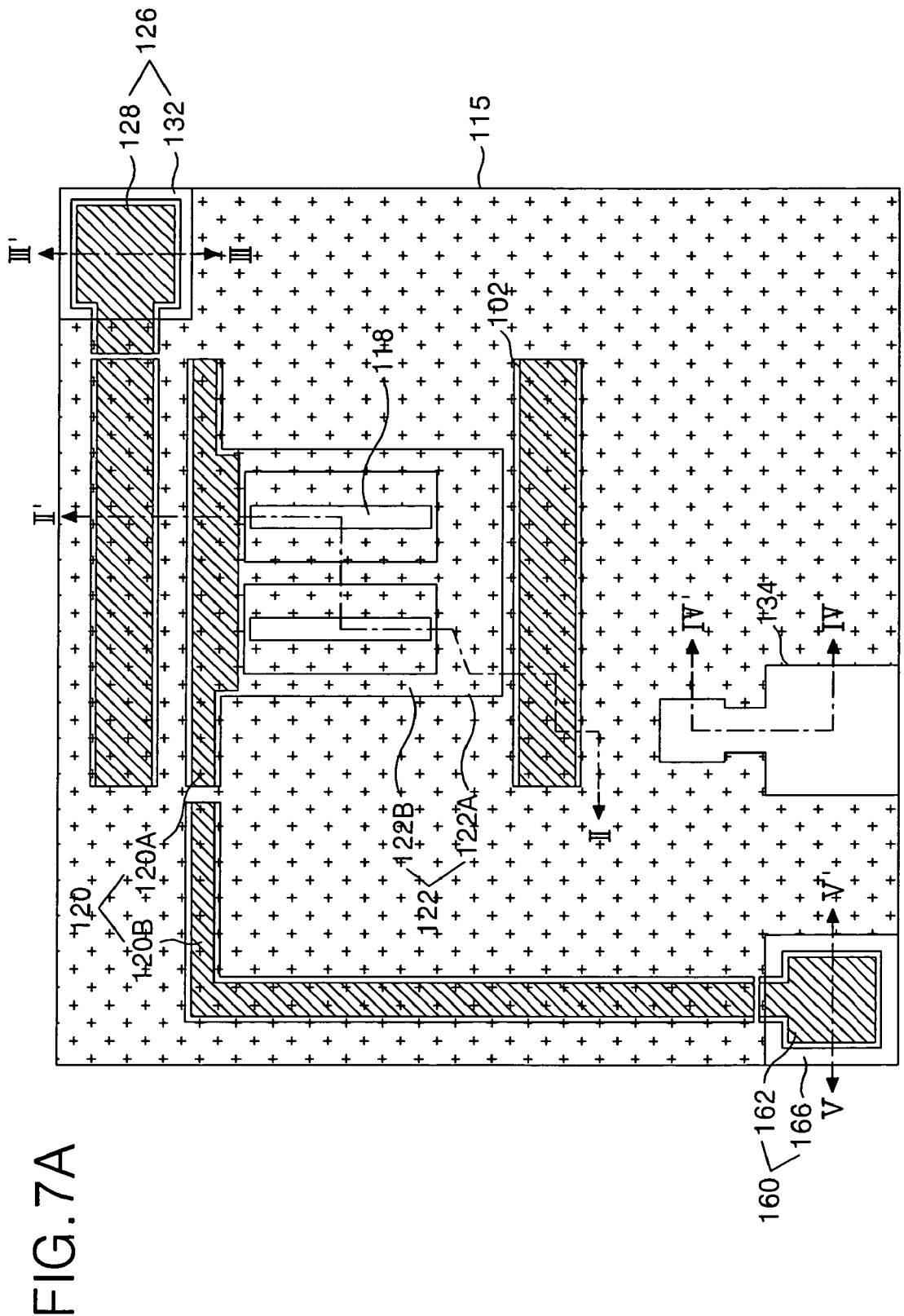
FIG. 7A and FIG. 7B are a plan view and a section view for explaining a second mask process in a method of fabricating the thin film transistor substrate of the horizontal electric field applying type according to the embodiment of the present invention, respectively.
Figure 7B:
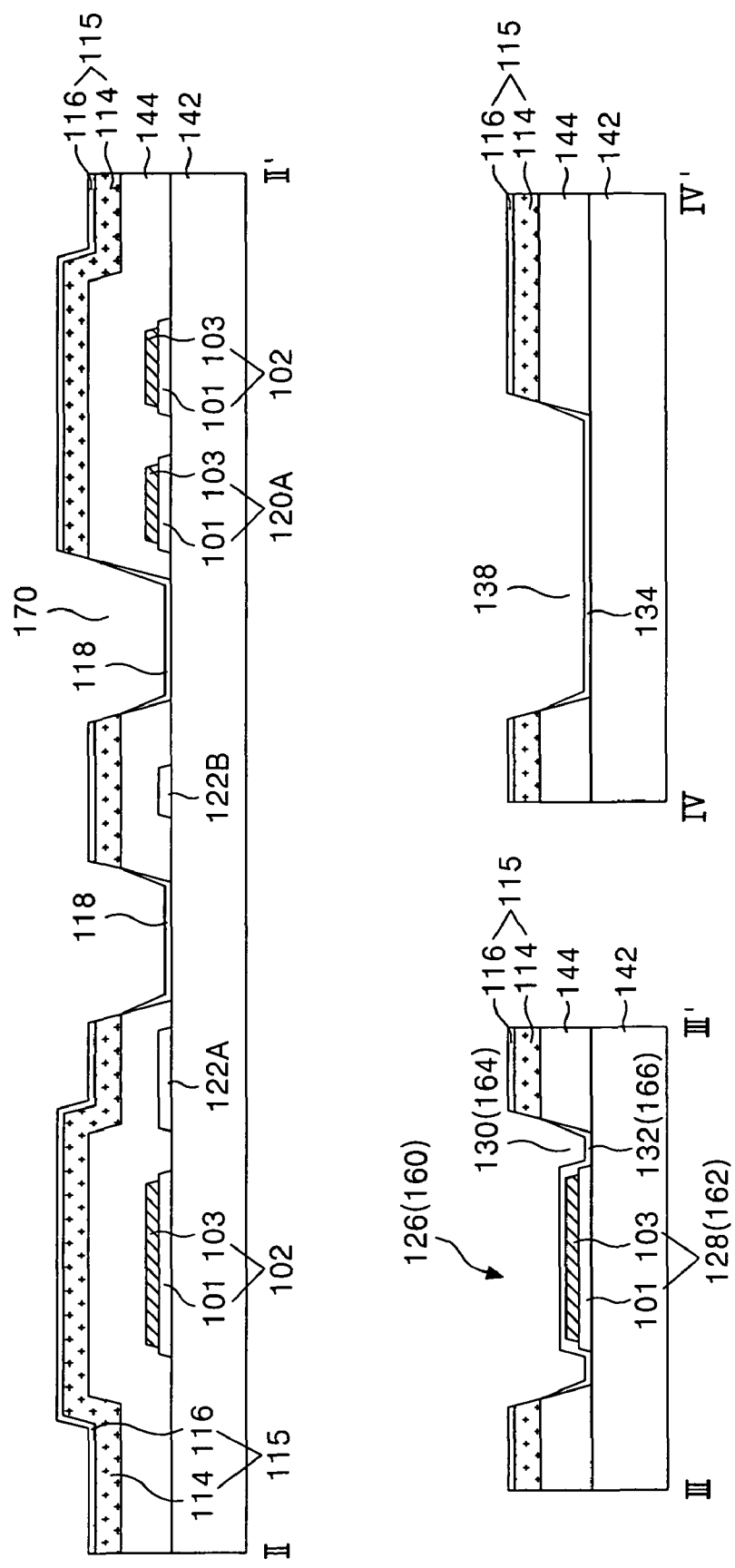
Figure 8A:
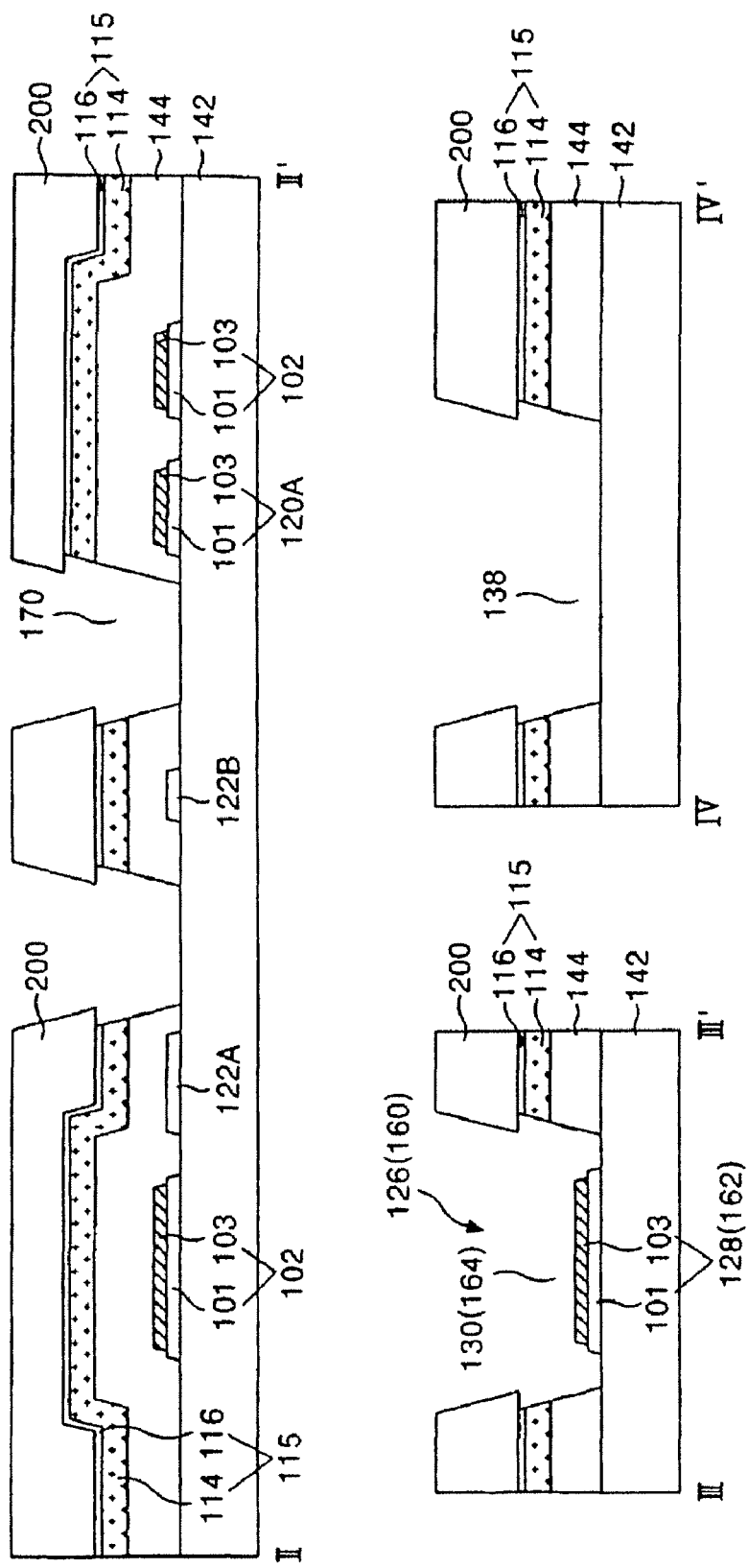
Figure 8B:
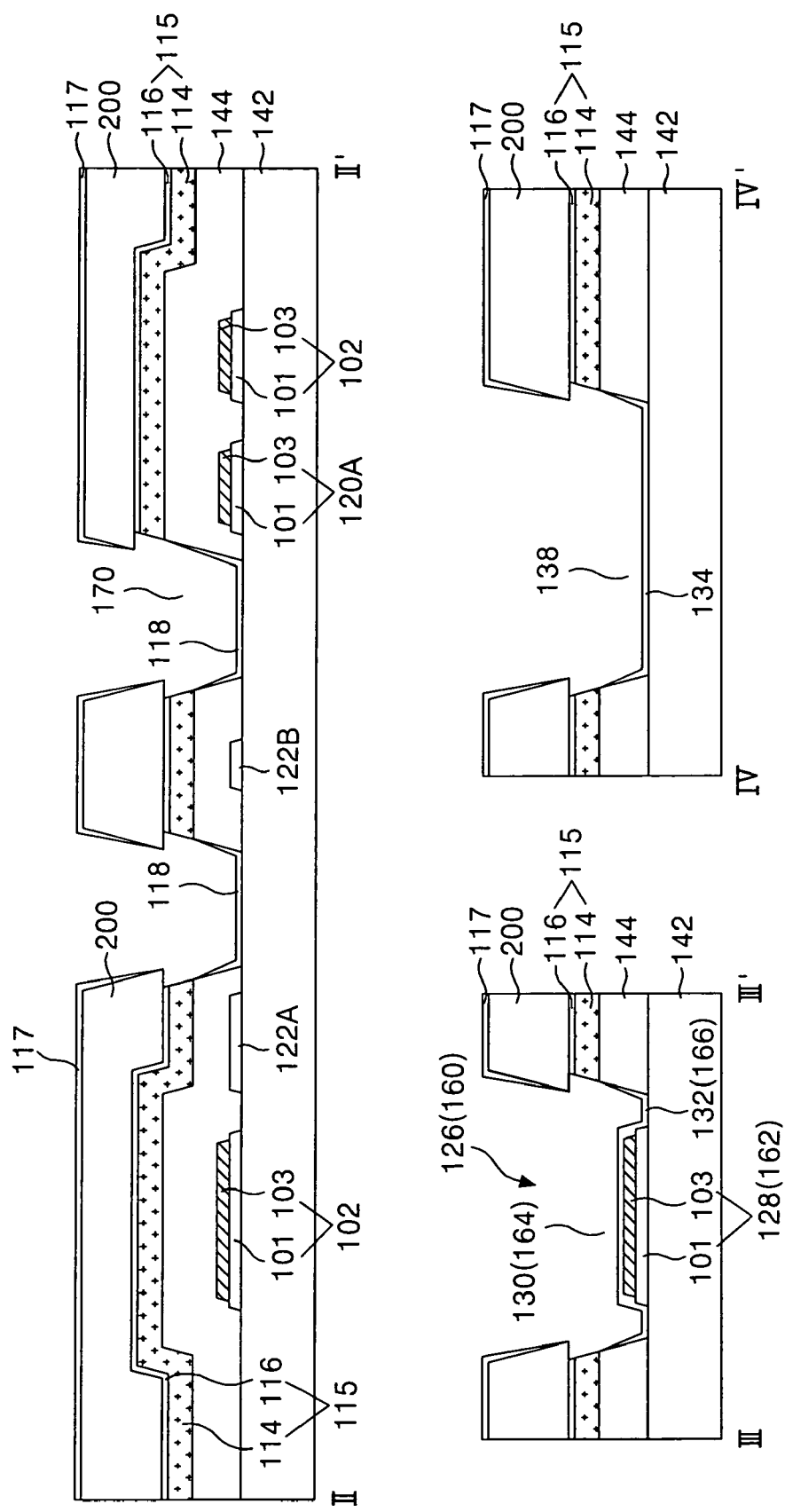

FIG. 7A and FIG. 7B are a plan view and a section view for explaining a second mask process in a method of fabricating the thin film transistor substrate of the horizontal electric field applying type according to the embodiment of the present invention, respectively, and FIG. 8A to FIG. 8C are section views for specifically explaining the second mask process.

The semiconductor layer 115 including the gate insulating film 144, the active layer 114 and the ohmic contact layer 116 is disposed on the lower substrate 142 provided with the first mask pattern group, and a pixel hole 170 passing through the semiconductor layer 115 and the first to third contact holes 130, 164 and 138 passing through the gate insulating film 144 are defined by the second mask process. Further, a transparent conductive pattern including the pixel electrode 118, the upper gate and common pad electrodes 132 and 166 and the data pad 134 is formed within the corresponding hole.

Referring to FIG. 8A, the gate insulating film 144 and the semiconductor layer 115 including the active layer 114 and the ohmic contact layer 116 are sequentially disposed on the lower substrate 142 provided with the first mask pattern group by a deposition technique such as the PECVD, etc. For example, the gate insulating film 144 is formed from an inorganic insulating material such as silicon nitride (SiNx) or silicon oxide (SiOx), whereas the active layer 114 and the ohmic contact layer 116 are formed from an amorphous silicon or an amorphous silicon doped with an n+ or p+ impurity.

Subsequently, a second photo-resist pattern 200 is formed on the ohmic contact layer 116 by the photolithography using a second mask, and the pixel hole 170 and the first to third contact holes 130, 164 and 138 are defined by the etching process using the second photo-resist pattern 200 as a mask. The pixel hole 170 and the first to third contact holes 130, 164 and 138 are provided in such a manner as to pass through an area extended from the ohmic contact layer until the gate insulating film 144. In this case, the semiconductor layer 115 and the gate insulating film 144 are over-etched such that the edges of the pixel hole 170 and the first to third contact holes 130, 164 and 138 are positioned at the inner side than the edge of the second photo-resist, thereby having an under-cut structure. For example, the pixel hole 170 parallel to the finger part 122B of the common electrode 122 and the third contact hole 138 expose the substrate 142, whereas the first and second contact holes 130 and 164 exposes the substrate 142 at the peripheral thereof along with the lower gate and common pad electrodes 128 and 162. Alternatively, the first and second contact holes 130 and 164 may be provided in such a manner as to expose only the lower gate and common electrodes 128 and 162.

Referring to FIG. 8B, the transparent conductive layer 117 is entirely formed on the substrate 142 provided with the photo-resist pattern 200 by a deposition technique such as the sputtering, etc. The transparent conductive layer 117 is formed of ITO, TO, IZO or ITZO, etc. Thus, the pixel electrode 118 is formed within the pixel hole 170; the upper gate and common pad electrodes 132 and 166 are formed within the first and second contact holes 130 and 164, respectively; and the data pad 134 is formed within the third contact hole 138. Such a transparent conductive pattern has an opened structure with respect to the transparent conductive layer 117 deposited onto the second photo-resist pattern 200 by a spaced distance between the edges of the pixel hole 170 and the first to third contact holes 130, 164 and 138 and the edge of the second photo-resist pattern 200. Further, the transparent conductive pattern is formed along the edges of the pixel hole 170 and the first to third contact holes 130, 164 and 138 to thereby make an interface with the gate insulating film 144 enclosing the corresponding hole. Accordingly, a stripper infiltration between the second photo-resist pattern 200 and the ohmic contact layer 116 is facilitated at the lift-off process of removing the photo-resist pattern 200 coated with the transparent conductive film 117, thereby improving lift-off efficiency.

Referring to FIG. 8C, the second photo-resist pattern 200 coated with the transparent conductive film 117 illustrated in FIG. 8B is removed by the lift-off process.

Figure 9A:
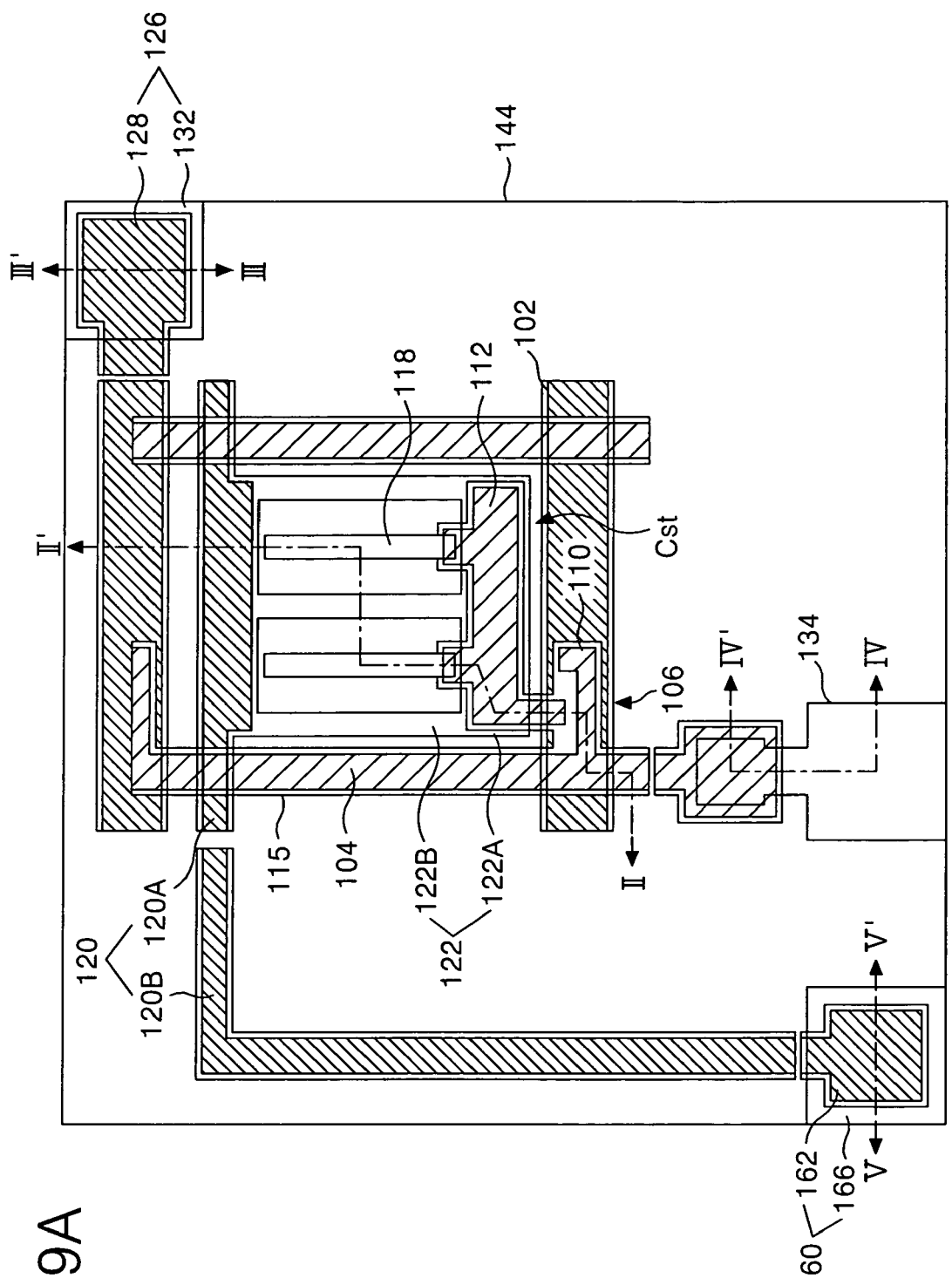
FIG. 9A and FIG. 9B are a plan view and a section view for explaining a third mask process in a method of fabricating the thin film transistor substrate of the horizontal electric field applying type according to the embodiment of the present invention, respectively.
Figure 9B:
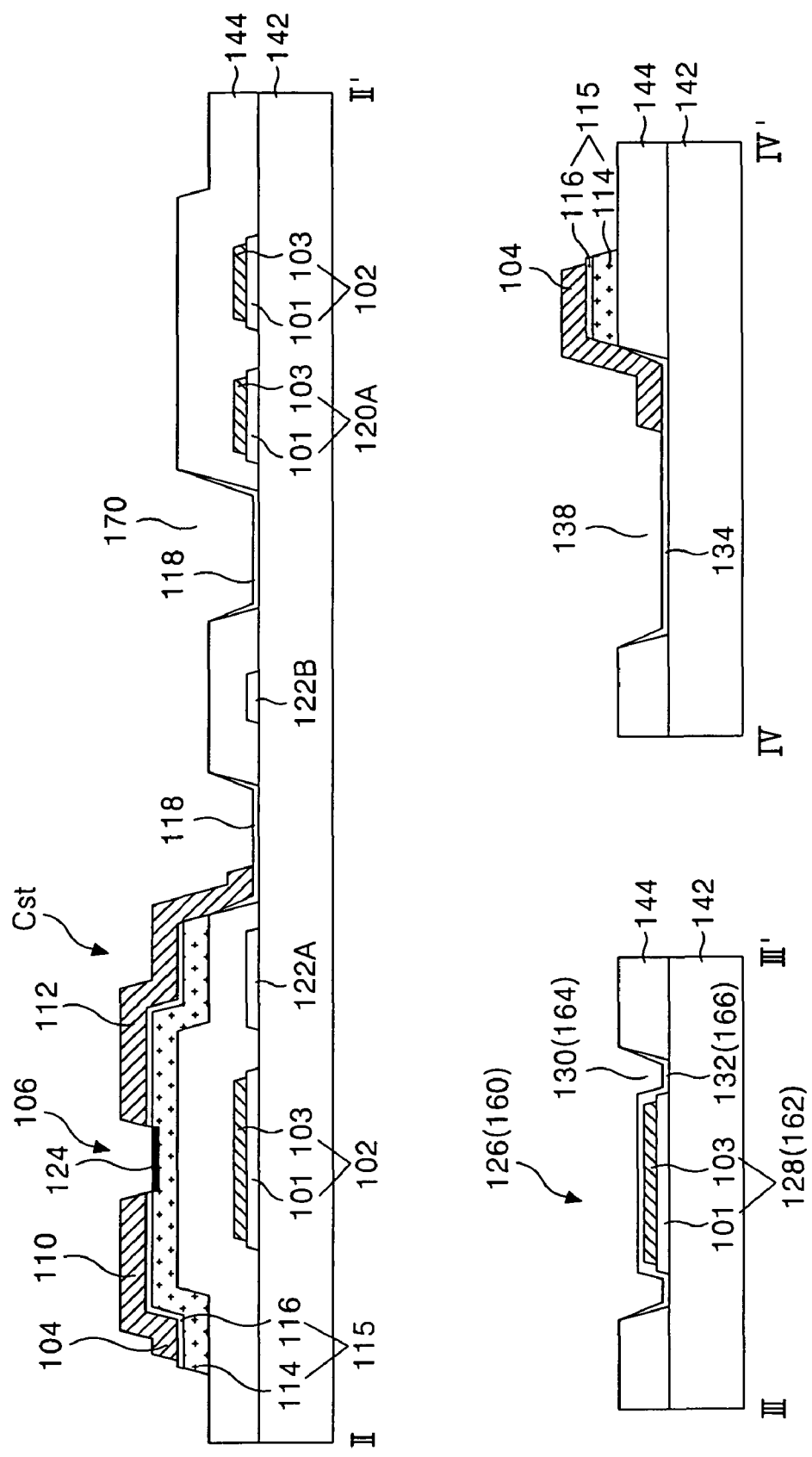

FIG. 9A and FIG. 9B are a plan view and a section view for explaining a third mask process in a method of fabricating the thin film transistor substrate of the horizontal electric field applying type according to the embodiment of the present invention, respectively, and FIG. 10A to FIG. 10D are section views for specifically explaining the third mask process.

A source/drain metal pattern including the data line 104, the source electrode 110 and the drain electrode 112 is formed on the lower substrate 142 provided with the semiconductor layer 115 and the transparent conductive pattern by the third mask process. Further, the semiconductor layer 115 non-overlapped with the source/drain metal pattern is removed and the active layer 114 between the source electrode 110 and the drain electrode 112 is exposed, thereby defining a channel of the thin film transistor 106. The source/drain metal pattern and the channel of the thin film transistor 106 are formed by a single of mask process employing a partial transmitting mask such as a diffractive exposure mask or a half tone mask, etc.

Referring to FIG. 10A, a source/drain metal layer is formed on the lower substrate 142 provided with the semiconductor layer 115 and the transparent conductive pattern by a deposition technique such as the sputtering, etc. The source/drain metal layer employs a single layer formed of a metal material such as Mo, Ti, Cu, AlNd, Al, Cr, a Mo alloy, a Cu alloy or an Al alloy, etc., or takes a layer built structure of at least double layers such as Al/Cr, Al/Mo, Al(Nd)/Al, Al(Nd)/Cr, Mo/Al (Nd)/Mo, Cu/Mo, Ti/Al(Nd)/Ti, Mo/Al, Mo/Ti/Al(Nd), Cu-alloy/Mo, Cu-alloy/Al, Cu-alloy/Mo-alloy, Cu-alloy/Al-alloy, Al/Mo alloy, Mo-alloy/Al, Al-alloy/Mo-alloy, Mo-alloy/Al-alloy, Mo/Al alloy, Cu/Mo alloy or Cu/Mo(Ti), etc.

Subsequently, a third photo-resist pattern 210 including photo-resist patterns 210A and 210B having a different thickness is formed on the source/drain metal layer by the photolithography using the partial transmitting mask. The partial transmitting mask includes a shielding part for shielding an ultraviolet ray, a partial transmitting part for diffracting the ultraviolet ray using a slit pattern or partially transmitting the ultraviolet ray using a phase-shifting material, and a full transmitting part for fully transmitting the ultraviolet ray. The third photo-resist pattern 210 including a different thickness of photo-resist patterns 210A and 210B and an aperture part is formed by the photolithography using the partial transmitting mask. In this case, a relatively thick photo-resist pattern 210A is provided at a shielding area P1 overlapping with the shielding part of the partial transmitting mask; the photo-resist pattern 210B thinner than the photo-resist pattern 210A is provided at a partial exposure area P2 overlapping with the partial transmitting part, that is, at an area to be provided with the channel; and the aperture part is provided at an full exposure area P3 overlapping with the full transmitting part.

Further, the source/drain metal layer is patterned by the etching process using the third photo-resist pattern 210 to thereby provide the source/drain metal pattern including the data line 104 and the drain electrode 112 being integral to the source electrode 110. For instance, the source/drain metal layer is patterned by the wet etching process, so that the source/drain metal pattern has an over-etched structure in comparison to the third photo-resist pattern 210. The drain electrode 112 of the source/drain metal pattern protrudes from the overlapping portion between it and the semiconductor layer 115 upward the pixel electrode 118 to be connected to the pixel electrode 118. The data line 104 also is protruded between the semiconductor 115 and the gate insulating film 144 into the inside of the third contact hole 138 to be connected to the data pad 134.

Referring to FIG. 10B, the semiconductor layer 115 exposed through the third photo-resist pattern 210 is etched, so that the semiconductor layer 115 exists only in the overlapping portion between it and the second photo-resist pattern 210. For instance, the exposed semiconductor layer 115 is etched by the dry etching process having linearity by utilizing the third photo-resist pattern 210 as a mask. Thus, the semiconductor layer 115 exists only in the overlapping portion between it and the third photo-resist pattern 210 used upon formation of the source/drain metal pattern to thereby overlap with the source/drain metal pattern, and has a structure in which the edge of the semiconductor layer 115 is more protruded than that of the source/drain metal pattern. As a result, the source/drain metal pattern and the semiconductor layer 115 have a step coverage in a stepwise shape.

Referring to FIG. 10C, a thickness of the photo-resist pattern 210A is thinned and the photo-resist pattern 210B illustrated in FIG. 10B is removed by the ashing process using an oxygen ($O_2$) plasma. Such an ashing process may be incorporated with the dry etching process for etching the exposed semiconductor layer 115 to be performed within the same chamber. Further, the exposed source/drain metal pattern and the ohmic contact layer 116 are removed by the etching process using the ashed photo-resist pattern 210A. Thus, the source electrode 110 and the drain electrode 112 are disconnected from each other, and the thin film transistor 106 having the channel for exposing the active layer 114 between them is completed.

Furthermore, the surface of the active layer 114 exposed by the surface treatment process using an oxygen ($O_2$) plasma is oxidized by $SiO_2$. Thus, the active layer 114 defining the channel of the thin film transistor 106 may be protected by the surface layer 124 oxidized by $SiO_2$.

Figure 10D:
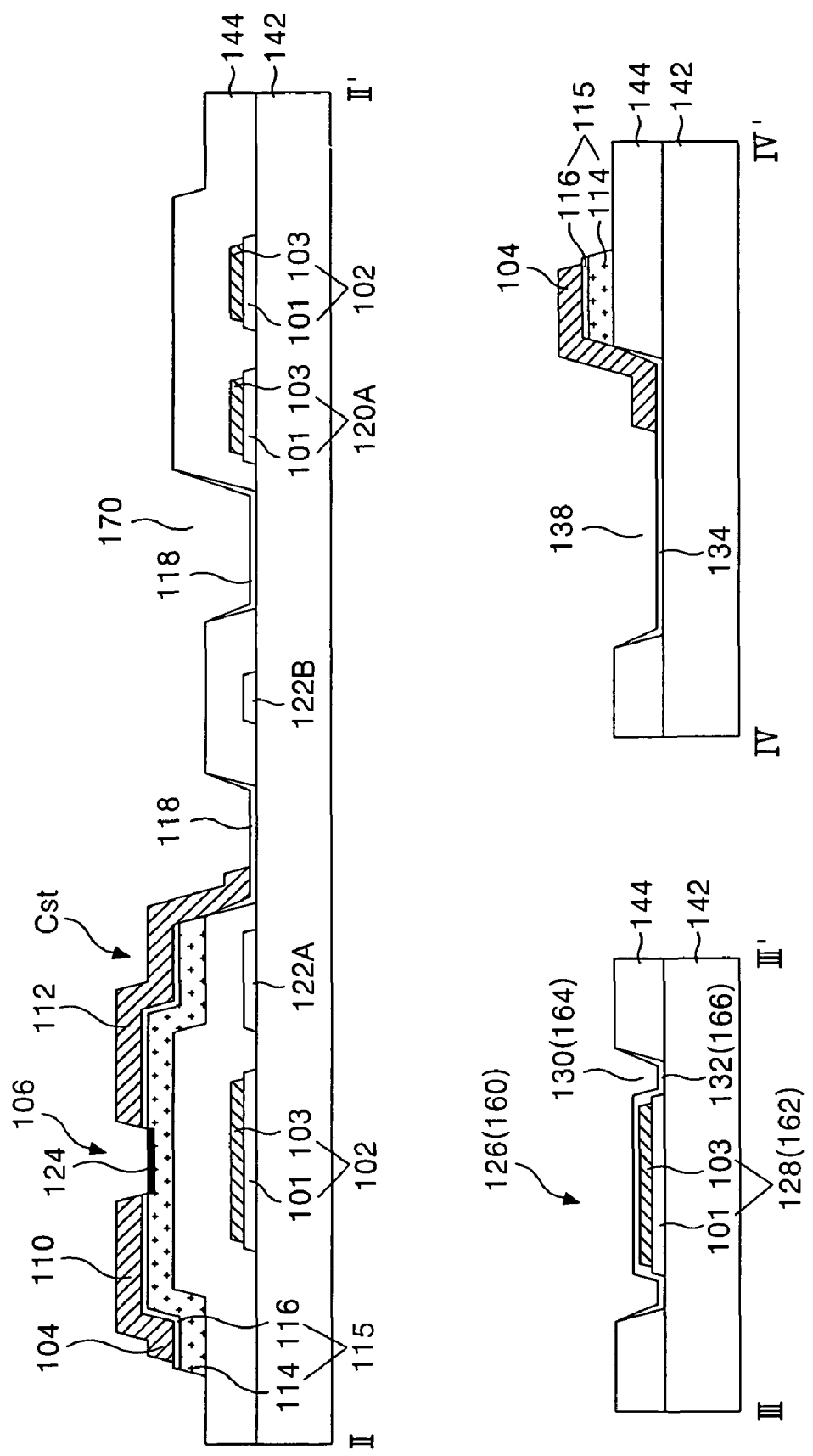

Referring to FIG. 10D, the photo-resist pattern 210A illustrated in FIG. 10C is removed by the stripping process.

As described above, the method of fabricating the FFS-type thin film transistor substrate according to the first embodiment of the present invention can reduce the number of processes by the three-round mask process.

Figure 11:
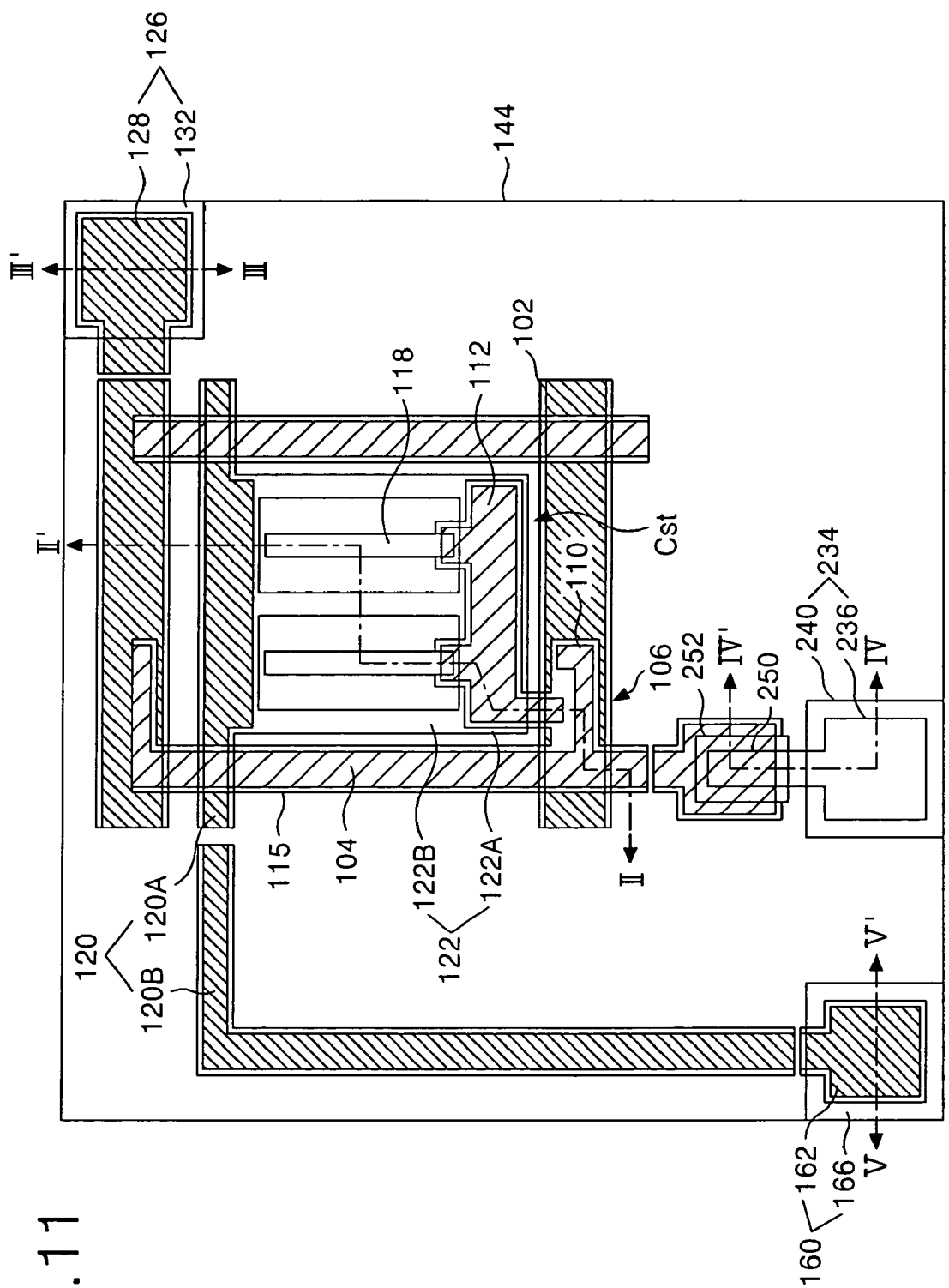
FIG. 11 is a plan view illustrating a portion of a thin film transistor substrate according to a second embodiment of the present invention.
Figure 12:
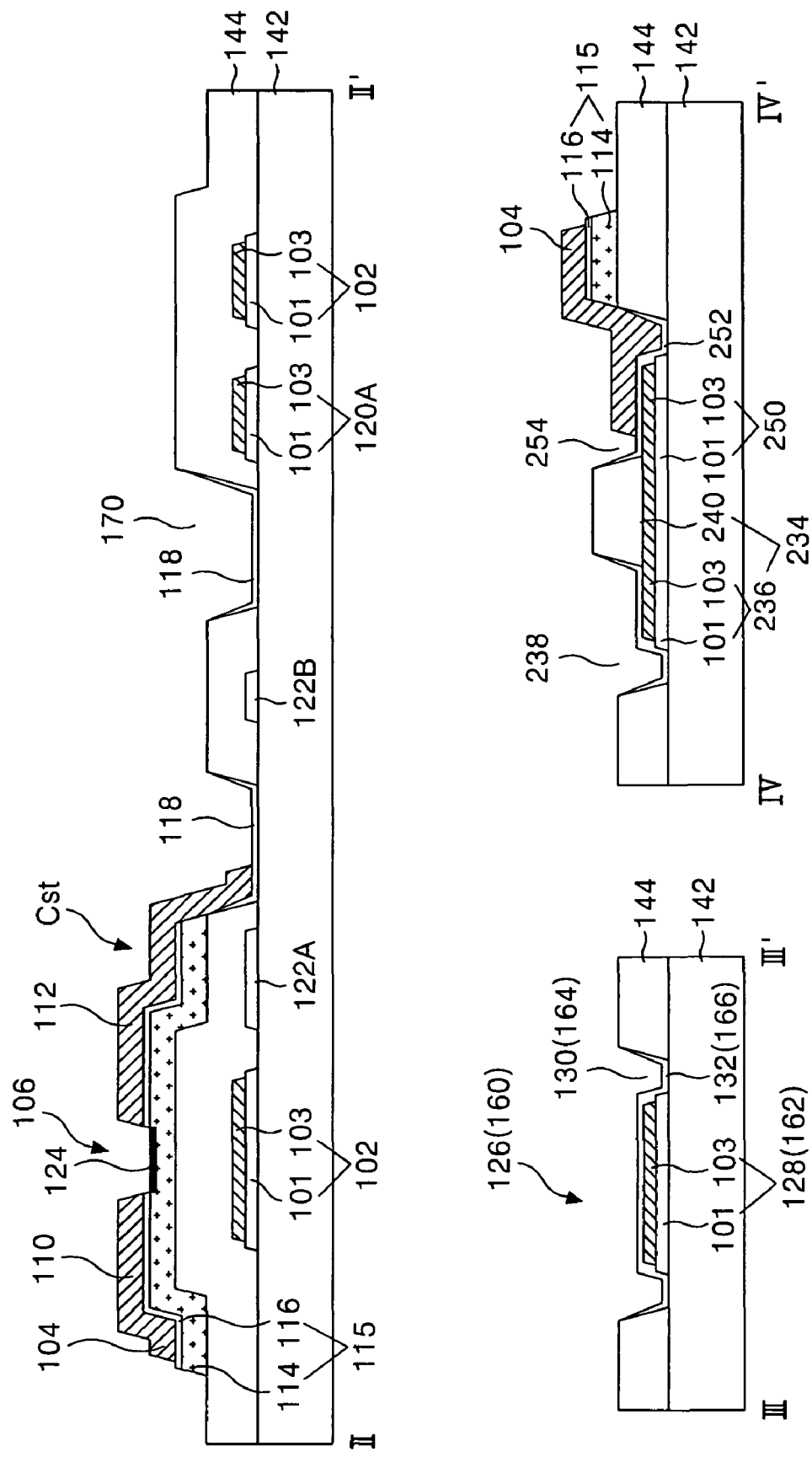
FIG. 12 is a section view of the thin film transistor substrate taken along the II-II', III-III' and IV-IV' lines in FIG. 11.

FIG. 11 is a plan view illustrating a portion of a FFS-type thin film transistor substrate according to a second embodiment of the present invention, and FIG. 12 is a section view of the thin film transistor substrate taken along the II-II', III-III' and IV-IV' lines in FIG. 11.

The thin film transistor substrate illustrated in FIG. 11 and FIG. 12 has the same elements as the thin film transistor substrate illustrated in FIG. 2 and FIG. 3 except that a data pad 234 has a vertical structure identical to the gate pad 126; and it further includes a contact electrode 252 for connecting a data link 250 extended from the data pad 234 to the data line 104. Therefore, an explanation as to the same elements will be omitted.

Referring to FIG. 11 and FIG. 12, the data pad 234 includes a lower data pad electrode 236 provided on the substrate 142, and an upper data pad electrode 240 provided within a third contact hole 238 passing through the gate insulating film 144 to expose the lower data pad electrode 236 to be connected to the lower data pad electrode 236 in similarity to the gate pad 126.

The data link 250 extends from the lower electrode 236 of the data pad 234 in such a manner as to overlap with the data line 104 and is exposed through a fourth contact hole 254 passing through the gate insulating film 144. The data link 250 is connected, via the contact electrode 252 provided within the fourth contact hole 254, to the data line 104.

For example, the lower data pad electrode 236 and the data link 250, along with the lower gate pad electrode 128, are provided by the first mask process. The third and fourth contact holes 238 and 254, along with the first contact hole 130, are formed by the second mask process. In the second mask process, the upper data pad electrode 240 and the contact electrode 252, along with the upper gate pad electrode 132, are formed within the third and fourth contact holes 238 and 254, respectively. In this case, the upper data pad electrode 240 and the contact electrode 252 make an interface with the edge of the gate insulating film 144 enclosing the third and fourth contact holes 238 and 254.

Further, the data line 104 is positioned within an area sealed by the sealant, so that it can be protected by the alignment film formed thereon or the liquid crystal formed in the sealed area. To this end, the contact electrode 252 for connecting the data line 104 to the data link 250 is located within the sealed area.

Figure 13:
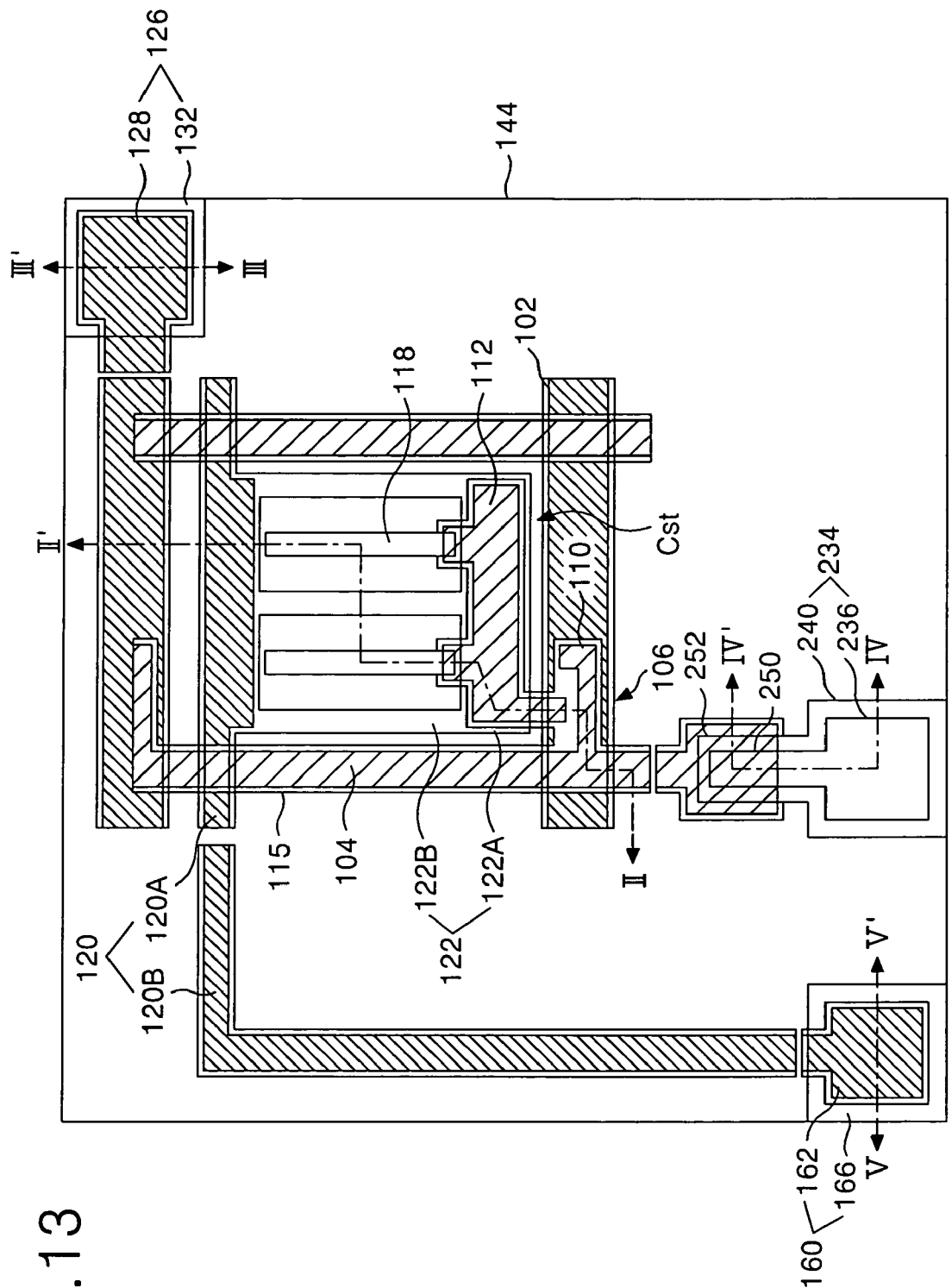
FIG. 13 is a plan view illustrating a portion of a thin film transistor substrate according to a third embodiment of the present invention.
Figure 14:
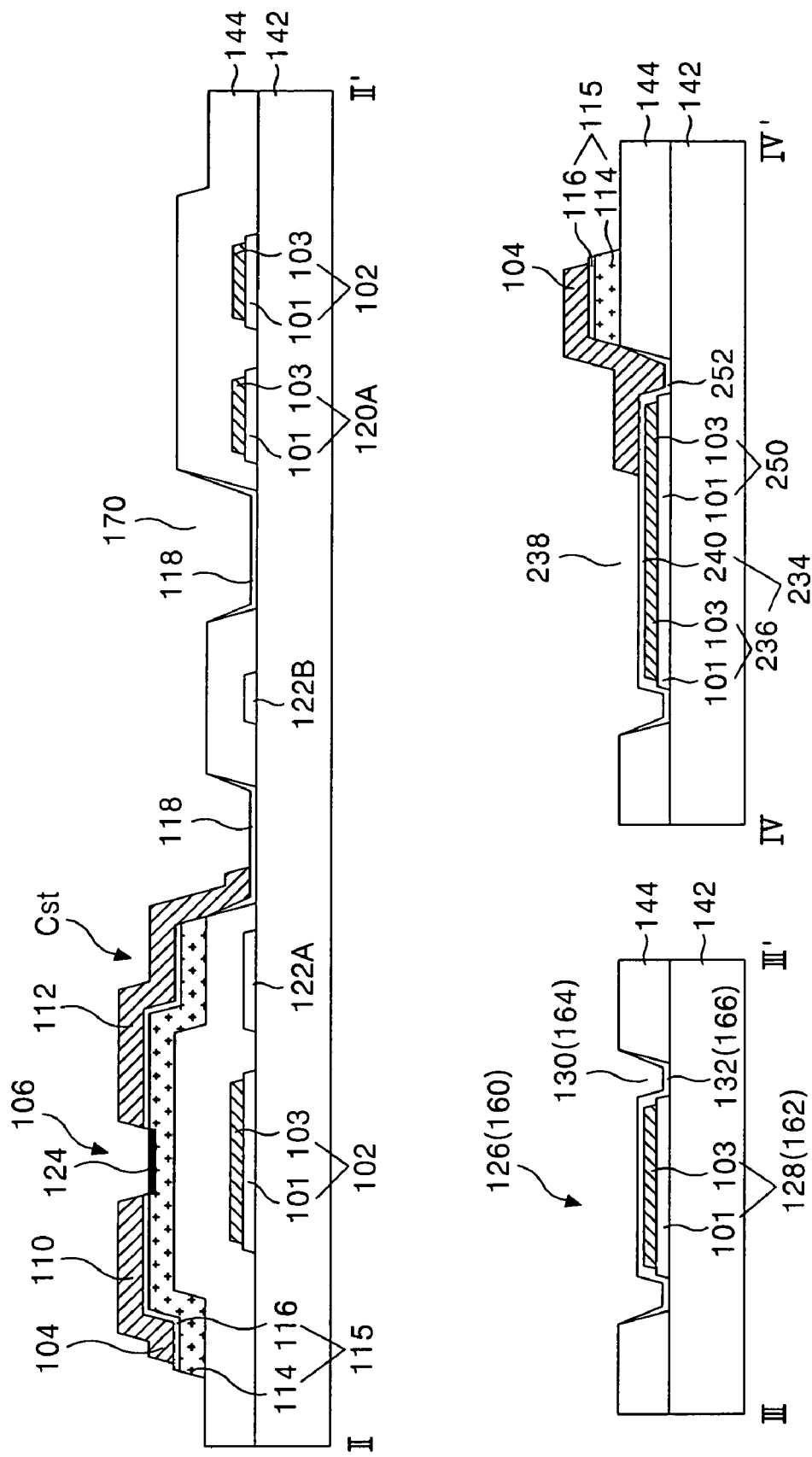
FIG. 14 is a section view of the thin film transistor substrate taken along the II-II', III-III' and IV-IV' lines in FIG. 13.

FIG. 13 is a plan view illustrating a portion of a FFS-type thin film transistor substrate according to a third embodiment of the present invention, and FIG. 14 is a section view of the thin film transistor substrate taken along the II-II', III-III' and IV-IV' lines in FIG. 13.

The thin film transistor substrate illustrated in FIG. 13 and FIG. 14 has the same elements as the thin film transistor substrate illustrated in FIG. 11 and FIG. 12 except that the upper data pad electrode 240 is integral to the contact electrode 252 within the third contact hole 238 extended along the data link 250. Therefore, an explanation as to the same elements will be omitted.

Referring to FIG. 13 and FIG. 14, the third contact hole 238 of the data pad 234 is extended along the data link 250 in such a manner as to overlap with the data line 104. Thus, the upper data pad electrode 240 and the contact electrode 252 are formed in an integral structure within the second contact hole 238 to be connected to the data line 104. The upper data pad electrode 240 and the contact electrode 252 make an interface with the edge of the gate insulating film 144 enclosing the third contact hole 238.

Figure 15:
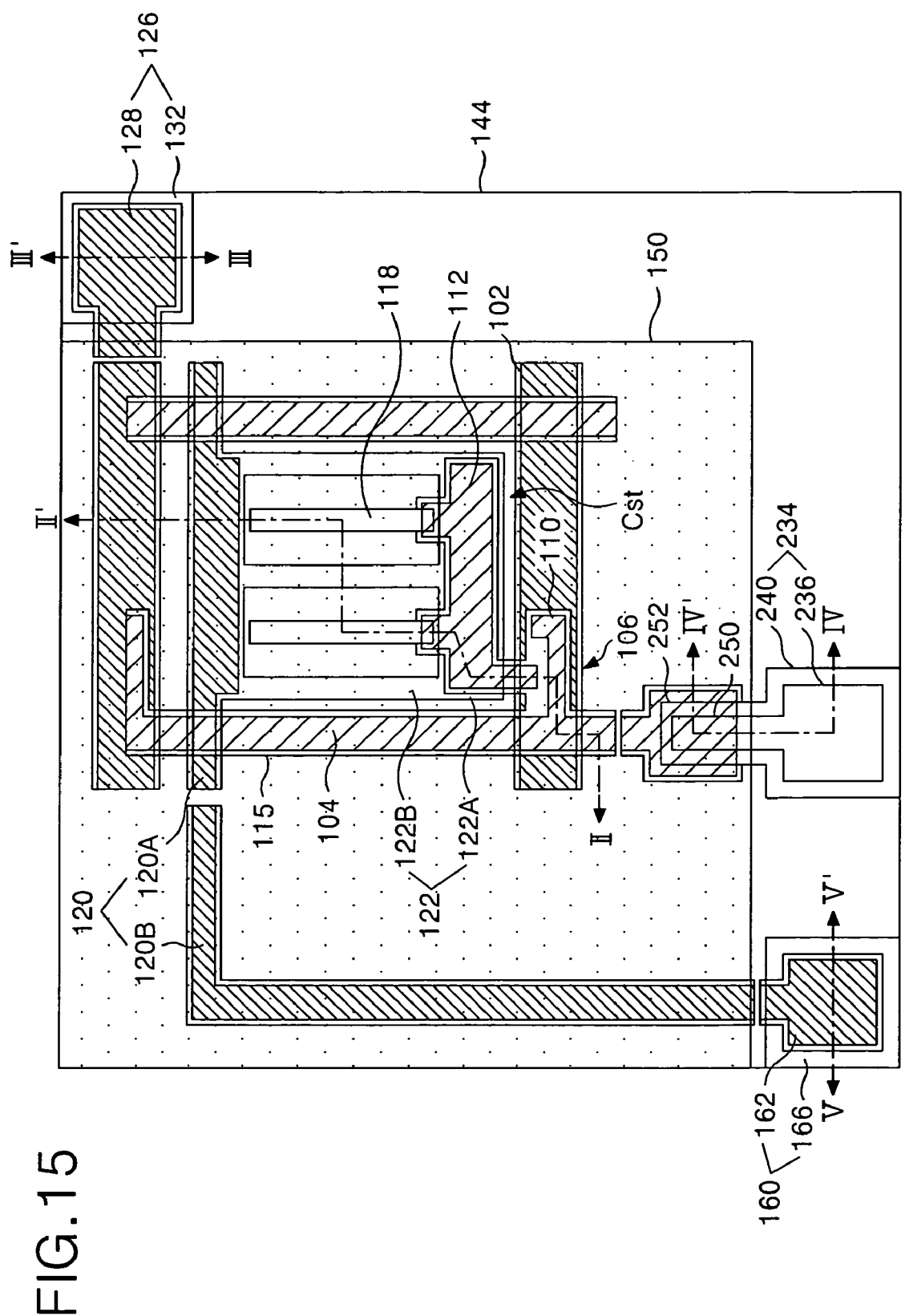
FIG. 15 is a plan view illustrating a portion of a thin film transistor substrate according to a fourth embodiment of the present invention.
Figure 16:
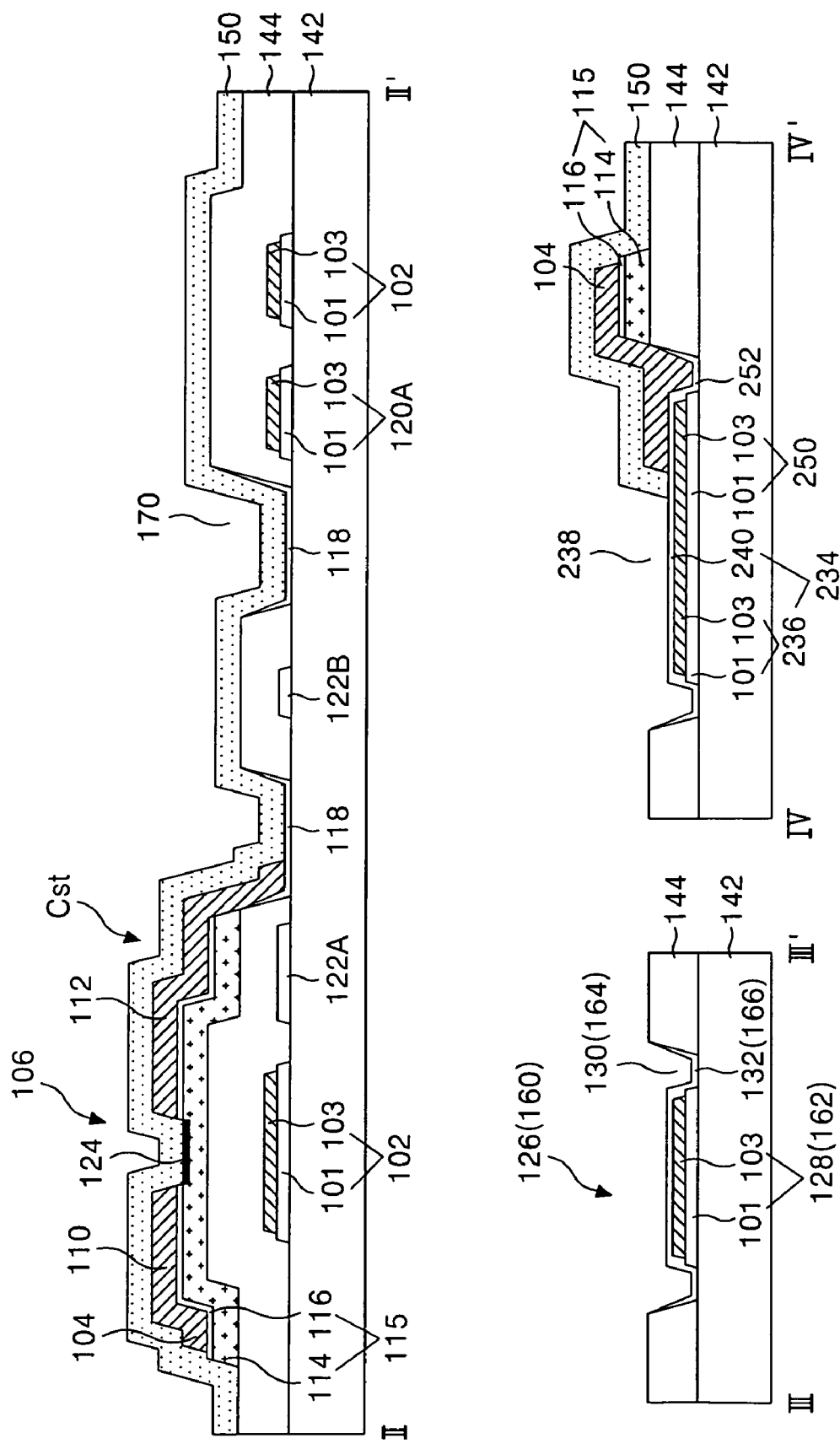
FIG. 16 is a section view of the thin film transistor substrate taken along the II-II', III-III' and IV-IV' lines in FIG. 15.

FIG. 15 is a plan view illustrating a portion of a FFS-type thin film transistor substrate according to a fourth embodiment of the present invention, and FIG. 16 is a section view of the thin film transistor substrate taken along the II-II', III-III' and IV-IV' lines in FIG. 15.

The thin film transistor substrate illustrated in FIG. 15 and FIG. 16 has the same elements as the thin film transistor substrate illustrated in FIG. 13 and FIG. 14 except that it further includes a protective film 150 provided at the remaining array area other than a pad area at which the gate pad 126 and a data pad 234 are positioned. Therefore, an explanation as to the same elements will be omitted.

Referring to FIG. 15 and FIG. 16, the protective film 150 is formed on the substrate 142 provided with the source/drain metal pattern in such a manner as to be opened at the pad area where the gate pad 126 and the data pad 134 are provided. The protective film 150 is formed from an inorganic insulating film like the gate insulating film 144. Alternatively, the protective film 150 may be formed an acrylic organic compound, BCB (benzocyclobutene) or PFCB (perfluorocyclobutane), etc.

The protective film 150 is formed by the fourth mask process, or by a rubber stamp printing system like the alignment film to be formed into the uppermost layer. Further, the protective film 150 is entirely formed on the substrate 142 and then is opened at the pad area by the etching process using the alignment film as a mask or by the etching process using the color filter substrate as a mask after a joint of the substrate 142 to the color filter substrate.

Firstly, when the fourth mask process is used, the protective film 150 is entirely formed on the substrate 142 provided with the source/drain metal pattern. In this case, the protective film 150 is formed by the PECVD, the spin coating or the spinless coating, etc. Further, the protective film 150 is patterned by the photolithography and the etching process using a fourth mask to be opened at the pad area.

Secondary, the protective film 150 is printed only at the remaining array area other than the pad area by the rubber stamp printing technique that is a method of forming the alignment film to be provided thereon, thereby being opened at the pad area. In other words, the protective film 150 is formed by aligning a rubber mask on the substrate 142 provided with the source/drain metal pattern and then printing an insulating material only at an array area other than the pad area by the rubber stamp printing technique.

Figure 17A:
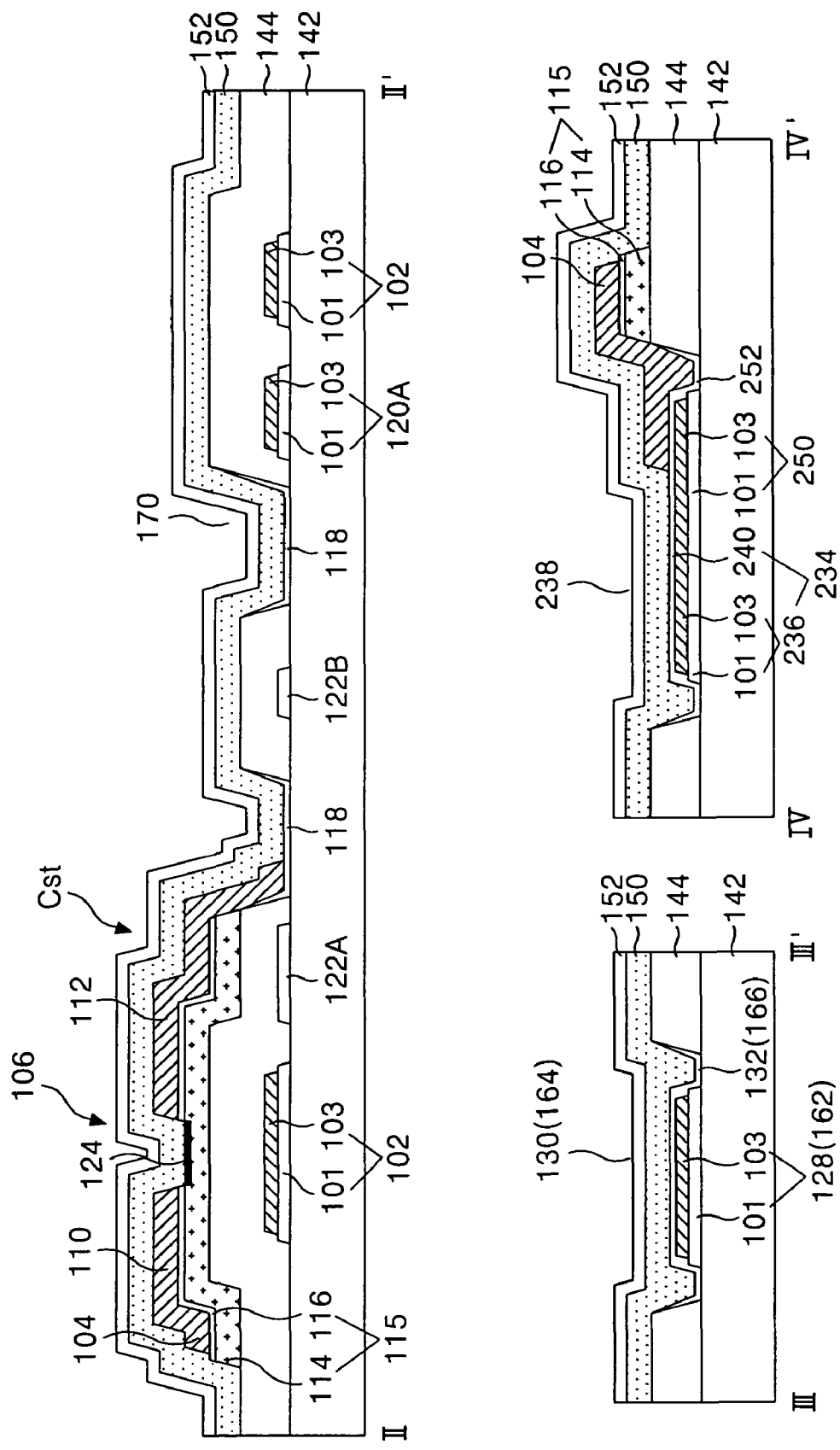

Third, the protective film 150 is opened at the pad area by the etching process using the alignment film provided thereon. More specifically, as illustrated in FIG. 17A, the protective film 150 is entirely formed on the substrate 142, and the alignment film 152 is formed on the protective film 150 by the rubber stamp printing method. Subsequently, as illustrated in FIG. 17B, the protective film 150 is opened at the pad area by the etching process using the alignment film 152 as a mask.

Figure 18A:
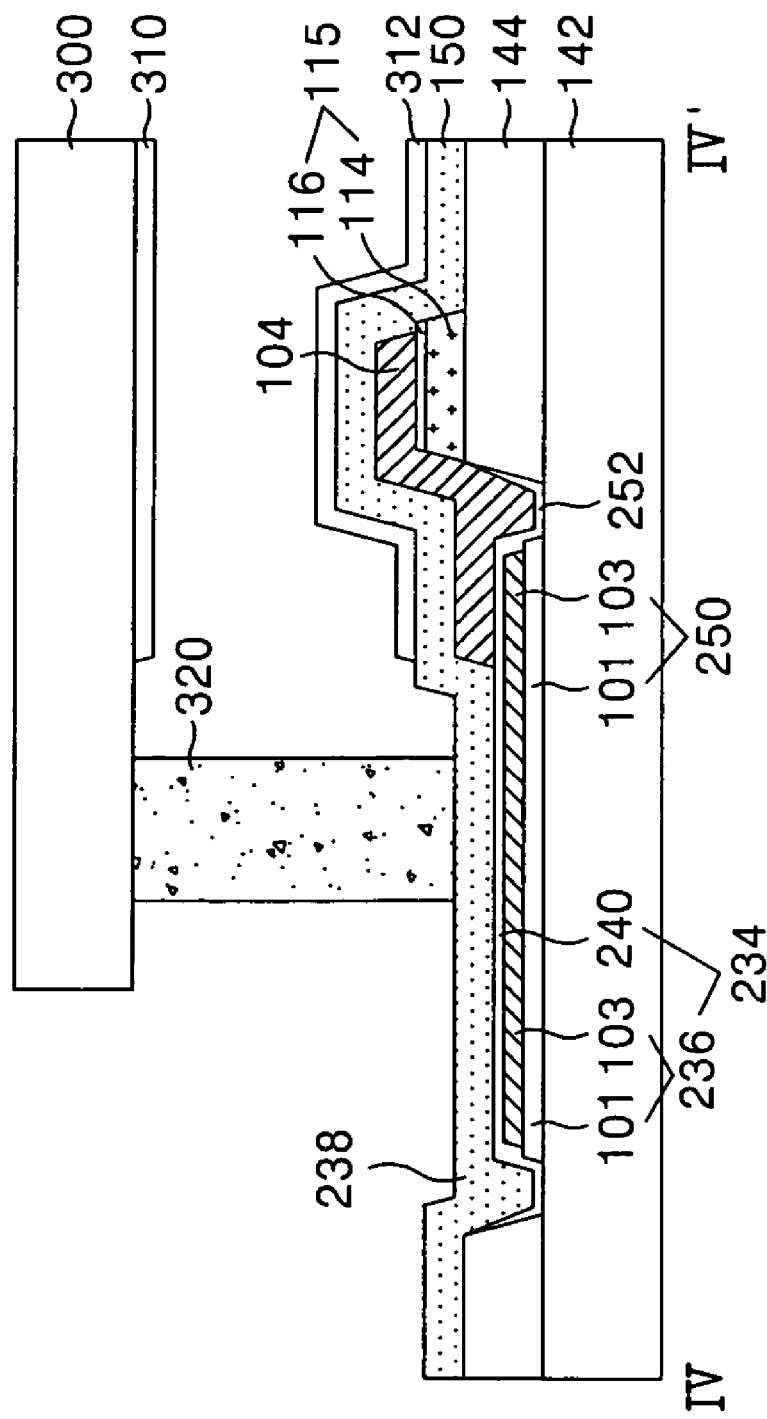
FIG. 18A and FIG. 18B are section views for explaining a fabricating method of the protective film in a method of fabricating the liquid crystal display panel employing the thin film transistor substrate according to the embodiment of the present invention.
Figure 18B:
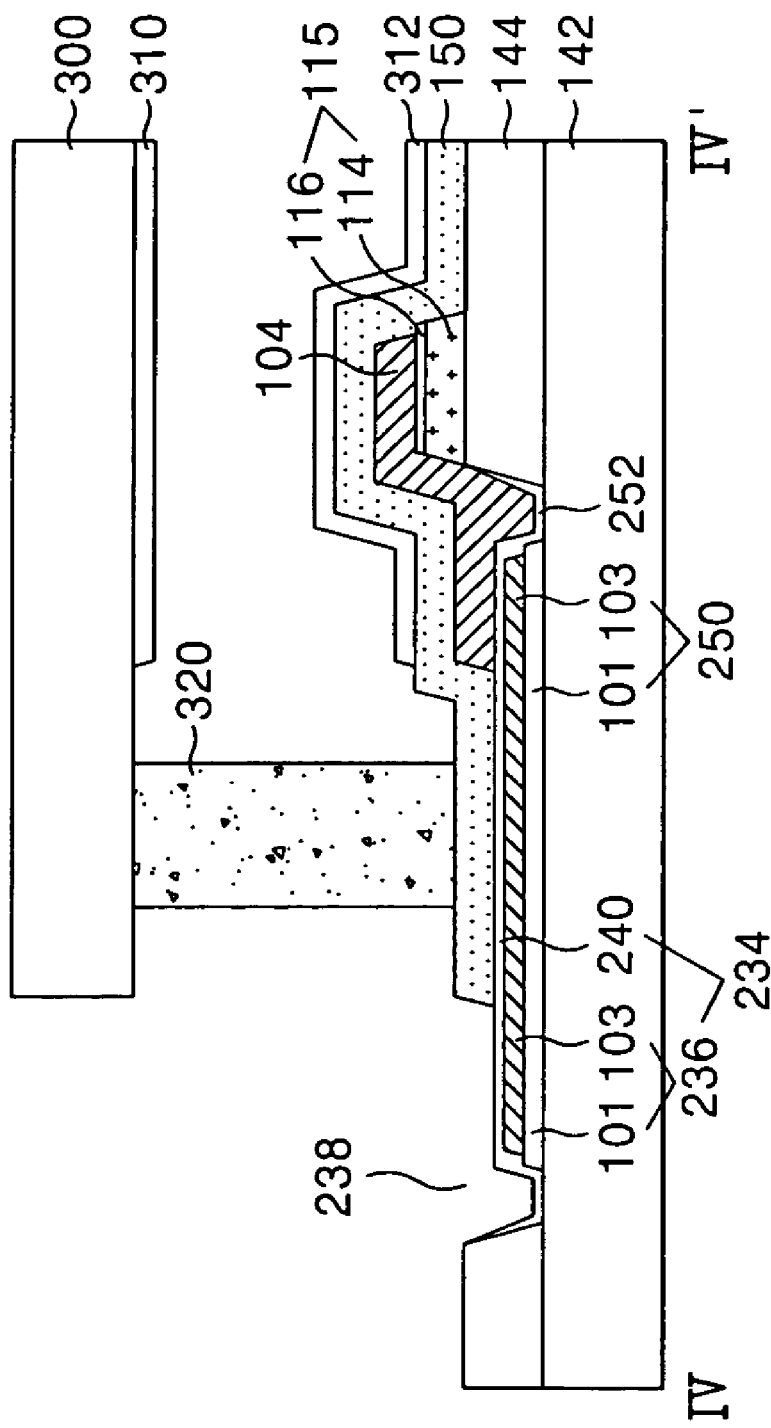

Fourth, the protective film 150 is opened at the pad area by the etching process using the color filter substrate as a mask. More specifically, as illustrated in FIG. 18A, the thin film transistor substrate provided with the protective film 150 and having the lower alignment film 312 provided on thereon is joined to the color filter substrate 300 provided with the upper alignment film 310 by the sealant 320. Next, as illustrated in FIG. 18B, the protective film 150 is opened at the pad area by the etching process using the color filter substrate 300 as a mask. In this case, the protective film 150 is opened at the pad area by the etching process using the plasma, or is opened at the pad area by a dipping technique of dipping the liquid crystal display panel in which the thin film transistor substrate is joined to the color filter substrate 300 into an etching vessel filled with an etchant.

As described above, according to the present invention, a single-layer structure of common electrode is formed, along with a multiple-layer structure of other first mask pattern group, with the aid of the first partial transmitting mask.

Furthermore, according to the present invention, the semiconductor layer and the gate insulating film are simultaneously patterned by the second mask process to provide a plurality of holes passing through an area extended until the gate insulating film and to provide the transparent conductive pattern within the plurality of hole by the lift-off process of the photo-resist pattern used in the mask process.

Moreover, according to the present invention, the semiconductor layer patterned simultaneously with the gate insulating film is again patterned upon formation of the source/drain metal pattern to remove the exposed portion thereof; and the active layer between the source electrode and the drain electrode is exposed to define the channel of the thin film transistor by utilizing the third partial transmitting mask. Thus, the semiconductor layer exists only in the channel of the thin film transistor and the overlapping portion between the source/drain metal pattern and the gate insulating film.

In addition, according to the present invention, the protective film having an opened pad area is further provided by the printing technique, the fourth mask process, the etching process using the alignment film as a mask or the etching process using the color filter substrate as a mask, etc.

Accordingly, the method of fabricating the thin film transistor according to the present invention can be simplified by the three-round mask process or the four-round mask process, so that it becomes possible to reduce the material cost and the equipment investment cost, etc. as well as to improve the productivity.

Although the present invention has been explained by the embodiments illustrated in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A method of fabricating a liquid crystal display device, comprising:
providing first and second substrates;
a first mask process of forming a first mask pattern group including a gate line, a gate electrode, a common line, a common electrode, a data link and a lower pad electrode to be connected to the data line on the first substrate;
a second mask process of forming a gate insulating film and a semiconductor layer on the first mask pattern group formed by the first mask process, defining a pixel hole spaced apart from the common line and a common electrode to pass through the gate insulating film and the semiconductor layer in a pixel area thereby exposing a surface of the first substrate, forming first and second contact holes for exposing the lower pad electrode and the data link and forming an upper pad electrode connected to the lower pad electrode and a contact electrode to be connected to the data link and the data line in the corresponding contact hole, and forming a pixel electrode to be contacted with the surface of the first substrate and a side wall of the gate insulating film exposed through the pixel hole in the pixel hole; and
a third mask process of forming a source and drain metal pattern including a data line crossing the gate line to define the pixel area, a source electrode and a drain electrode on the first substrate, and exposing an active layer of the semiconductor pattern to define a channel between the source electrode and the drain electrode,
wherein a portion of the drain electrode covers a part of upper surface of the pixel electrode at bottom part of the pixel hole,
wherein the first to third mask processes are sequentially performed, and wherein the second mask process includes:
forming a photo-resist pattern on the semiconductor layer;
forming the pixel hole and the first and second contact holes using the photo-resist pattern as a mask;
forming a transparent conductive film on the photo-resist pattern, and forming transparent conductive patterns in the pixel hole and the first and second contact holes; and
removing the photo-resist pattern with the transparent conductive film formed on the photo-resist pattern.

2. The method as claimed in claim 1, wherein the gate line, the gate electrode and the common line have at least double conductive layers including a transparent conductive layer, and the common electrode is formed by an extension of the transparent conductive layer of the common line.

3. The method as claimed in claim 1, wherein the gate line and the common line are formed of a metal layer.

4. The method as claimed in claim 1, wherein the pixel electrode borders with the gate insulating film in the pixel hole.

5. The method as claimed in claim 1, wherein the first mask process comprises:
forming the at least double conductive layer on the first substrate;
forming photo-resist patterns having a different thickness by a photolithography using a partial transmitting mask;
forming the first mask pattern group including the common electrode having the at least double conductive layer by an etching process using the photo-resist pattern; and
etching the common electrode to leave a transparent conductive layer thereof by said etching process using the photo-resist pattern.

6. The method as claimed in claim 1, wherein the third mask process further includes:
   allowing the semiconductor layer to exist in the channel and an overlapping portion between the source and drain metal pattern and the gate insulating film.

7. The method as claimed in claim 6, wherein the third mask process includes:
   forming a source and drain metal pattern including a data line and a drain electrode being integral to the source electrode on the first substrate;
   etching a semiconductor layer exposed through the source and drain metal pattern; and
   exposing the active layer between the source and drain electrodes to define the channel.

8. The method as claimed in claim 6, wherein the third mask process includes:
   forming a source and drain metal layer on the first substrate and forming photo-resist pattern having a different thickness thereon;
   patterning the source and drain metal layer through the photo-resist patterns to provide the source and drain metal pattern including the data line and the drain electrode being integral to the source electrode;
   etching a semiconductor layer exposed through the photo-resist patterns; and
   exposing the active layer between the source and drain electrodes through the photo-resist patterns to form the channel.

9. The method as claimed in claim 1, wherein the third mask process further includes:
   forming a storage capacitor such that the drain electrode overlaps with a portion of the common electrode, the gate insulating film and the semiconductor layer.

10. The method as claimed in claim 1, wherein:
    the first mask process further includes forming a lower pad electrode connected to at least one of the gate line and the common line, and
    the second mask process further includes forming a contact hole for exposing the lower pad electrode and forming an upper pad electrode connected to the lower pad electrode in the contact hole.

11. The method as claimed in claim 1, wherein the first contact hole with the upper pad electrode is extended along the data link to be integral to the second contact hole, and the upper pad electrode is integral to the contact electrode.

12. The method as claimed in claim 1, wherein a transparent conductive pattern including at least one of the pixel electrode, the upper pad electrode and the contact electrode border with the gate insulating film enclosing the corresponding contact hole.

13. The method as claimed in claim 10, wherein a transparent conductive pattern including at least one of the pixel electrode, the upper pad electrode and the contact electrode border with the gate insulating film enclosing the contact hole.

14. The method as claimed in claim 1, wherein a contact portion between the data line and the contact electrode is in an area to be sealed by a sealant upon joining of the first substrate with the second substrate.

15. The method as claimed in claim 11, wherein a contact portion between the data line and the contact electrode is in an area to be sealed by a sealant upon joining of the first substrate with the second substrate.

16. The method as claimed in claim 1, wherein the second mask process further includes:
    forming a contact hole passing through the semiconductor layer and the gate insulating film and to be overlapped with the data line; and
    forming a pad to be connected to the data line in the contact hole.

17. The method as claimed in claim 16, wherein the pad borders with the gate insulating film enclosing the contact hole.

18. The method as claimed in claim 16, wherein the data line is in an area to be sealed by a sealant upon joining of the first substrate with the second substrate.

19. The method as claimed in claim 1, wherein the third mask process further includes:
    surface treating the channel of the thin film transistor with plasma to oxidize the surface layer.

20. The method as claimed in claim 6, wherein the semiconductor layer and the source and drain metal pattern have a shape.

21. The method as claimed in claim 10, wherein the second mask process includes:
    forming a photo-resist pattern on the semiconductor layer;
    forming the pixel hole and the contact hole using the photo-resist pattern as a mask;
    forming a transparent conductive film on the photo-resist pattern, and forming the corresponding transparent conductive pattern in the pixel hole and the contact hole; and
    removing the photo-resist pattern formed with the transparent conductive film.

22. The method as claimed in claim 21, wherein the semiconductor layer and the gate insulating film are over-etched such that the edges of the pixel hole and the contact hole are positioned at the inner side than the photo-resist pattern.

23. The method as claimed in claim 21, further comprising:
    a fourth mask process of forming a protective film on the first substrate and opened at a pad area where a pad is to be formed.

24. The method as claimed in claim 21, further comprising:
    printing the protective film on the first substrate in such a manner as to be opened at a pad area where a pad is to be formed.

25. The method as claimed in claim 21, further comprising:
    forming the protective film on the first substrate;
    forming an alignment film on the protective film; and
    removing the protective film at a pad area by an etching using the alignment film as a mask.

26. The method as claimed in claim 21, further comprising:
    forming the protective film on the first substrate;
    attaching the first and second substrates; and
    removing the protective film at a pad area by an etching using the second substrate as a mask.

27. The method as claimed in claim 1, wherein the semiconductor layer and the gate insulating film are over-etched such that the edges of the pixel hole and the contact hole are positioned at the inner side than the photo-resist pattern.

28. The method as claimed in claim 1, further comprising:
    a fourth mask process of forming a protective film on the first substrate and opened at a pad area provided with the pad.

29. The method as claimed in claim 1, further comprising:
    printing the protective film on the first substrate in such a manner as to be opened at a pad area provided with the pad.

30. The method as claimed in claim 1, further comprising:
    forming the protective film on the first substrate;
    forming an alignment film on the protective film; and removing the protective film at a pad area by an etching using the alignment film as a mask.

31. The method as claimed in claim 1, further comprising:
forming the protective film on the first substrate;
attaching the first and second substrates; and
removing the protective film at a pad area by an etching using the second substrate as a mask.

32. The method as claimed in claim 1, further comprising:
forming a liquid crystal layer between the first and second substrates.

\* \* \* \* \*